US 6,618,102 B2

(12) United States Patent
Harada et al.

(10) Patent No.: US 6,618,102 B2
(45) Date of Patent: Sep. 9, 2003

(54) DISPLAY ELEMENT, WRITING METHOD AND WRITING APPARATUS

(75) Inventors: Haruo Harada, Nakai-machi (JP); Hiroshi Arisawa, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/730,394

(22) Filed: Dec. 6, 2000

(65) Prior Publication Data

US 2001/0040542 A1 Nov. 15, 2001

(30) Foreign Application Priority Data

Jan. 14, 2000 (JP) ...................................... 2000-010148

(51) Int. Cl.[7] ............................................ G02F 1/1335
(52) U.S. Cl. .......................... 349/78; 349/76; 349/113; 349/176
(58) Field of Search ............................ 349/74, 77, 79, 349/86, 108, 113, 163, 187, 78, 176

(56) References Cited

U.S. PATENT DOCUMENTS 4,606,613 A * 8/1986 Urabe ......................... 349/22

6,377,321 B1 * 4/2002 Khan et al. .................. 349/35

FOREIGN PATENT DOCUMENTS

JP  10177191  * 6/1998 ........... G02F/1/137
JP  11149088  * 6/1999 ......... G02F/1/1347

* cited by examiner

Primary Examiner—Tarifur R. Chowdhury
Assistant Examiner—P. R. Akkapeddi
(74) Attorney, Agent, or Firm—Oliff & Berridge, PLC

(57) ABSTRACT

In a display element in which three or more display layers for displaying mutually different color lights are stacked within one pixel and which controls display states of the plural display layers by applying a voltage from the outside of the plural display layers, eight colors—white, black, blue, green, red, cyan, magenta, and yellow—can be displayed within one pixel. Display layers having cholesteric liquid crystals selectively reflecting blue, green, and red lights are stacked between a pair of substrates, and a light absorption layer is formed on the back of the substrate of a non-display side. Threshold voltages of orientation change of the display layers are mutually changed, and a threshold voltage Vpf90(A) of change from a planar state to a focal conic state of the display layer having the highest threshold voltage is made higher than a threshold voltage Vfh90(C) of change from a focal conic state to a homeotropic state of the display layer having the lowest threshold voltage.

8 Claims, 18 Drawing Sheets

| | | REFRESH VOLTAGE Vr | | | | | |
|---|---|---|---|---|---|---|---|
| | | Vb | Vc | Vd | Ve | Vf | Vg |
| SELECT VOLTAGE Vs | Va | f/?/? | f/f/? | f/f/f | p/f/f | p/p/f | p/p/p |
| | Vb | — | f/f/? | f/f/f | f/f/f | f/p/f | f/p/p |
| | Vc | — | — | f/f/f | f/f/f | f/f/f | f/f/p |
| | Vd | — | — | — | p/f/f | p/f/f | p/f/p |
| | Ve | — | — | — | — | p/f/f | p/f/f |
| | Vf | — | — | — | — | — | p/p/f |

8C / 8B / 8A

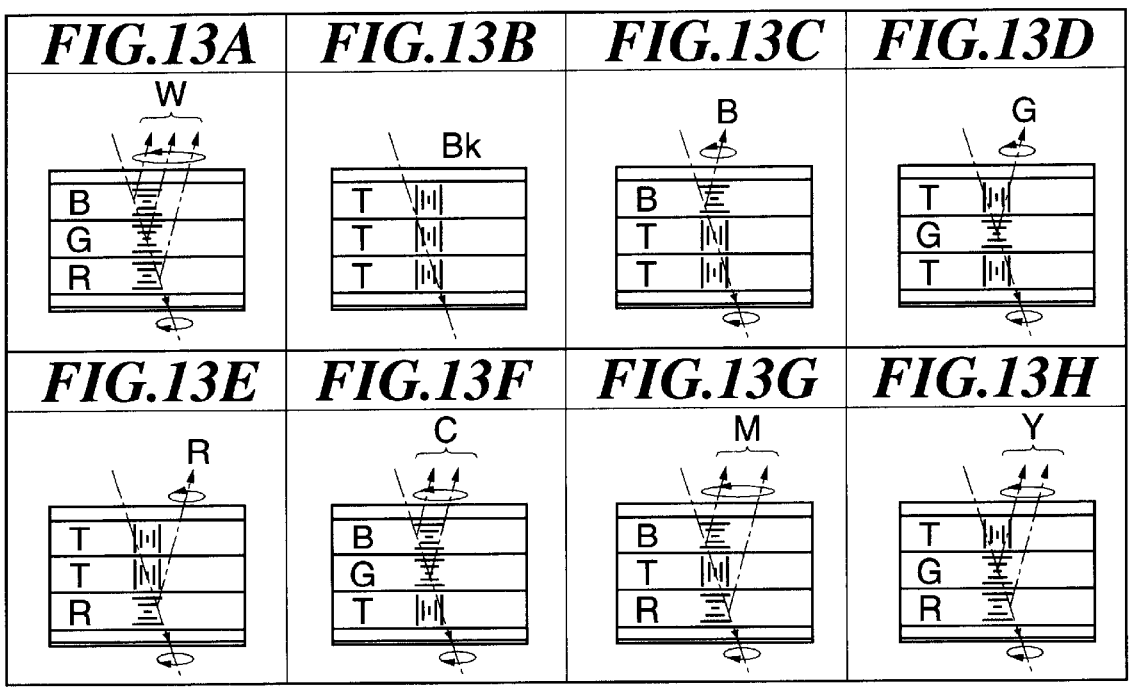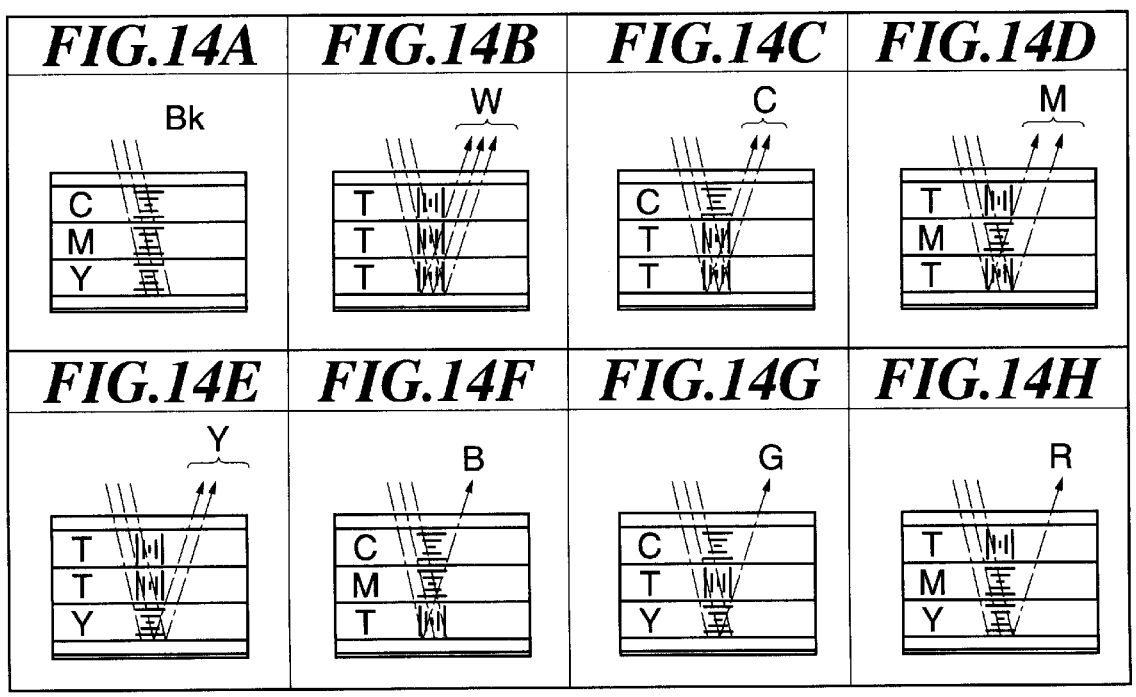

PRESET VOLTAGE Vp=Vg

| | | REFRESH VOLTAGE Vr | | | | | |
|---|---|---|---|---|---|---|---|
| | | Vb | Vc | Vd | Ve | Vf | Vg |
| SELECT VOLTAGE Vs | Va | f/p/p | p/p/p | p/f/p | p/f/f | p/p/f | p/p/p |
| | Vb | — | f/p/p | f/f/p | f/f/f | f/p/f | f/p/p |
| | Vc | — | — | p/f/p | p/f/f | p/p/f | p/p/p |
| | Vd | — | — | — | p/f/f | p/f/f | p/f/p |
| | Ve | — | — | — | — | p/f/f | p/f/f |
| | Vf | — | — | — | — | — | p/p/f |

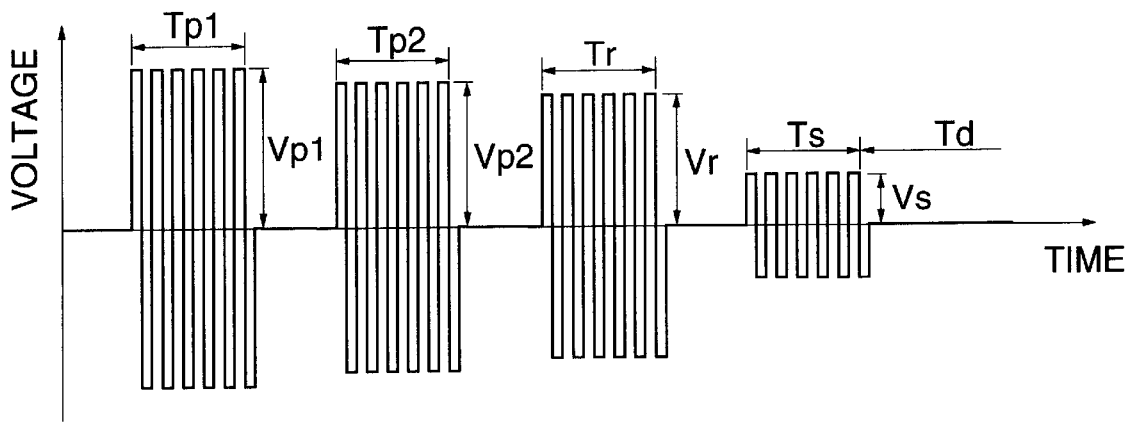

FIG.20
PRESET VOLTAGE Vp1=Vg, Vp2=Vf

| | | REFRESH VOLTAGE Vr | | | | | |
|---|---|---|---|---|---|---|---|
| | | Vb | Vc | Vd | Ve | Vf | Vg |
| SELECT VOLTAGE Vs | Va | f/p/f | p/p/f | p/f/f | p/p/f | p/p/f | p/p/p |
| | Vb | — | f/p/f | f/f/f | f/p/f | f/p/f | f/p/p |
| | Vc | — | — | p/f/f | p/f/f | p/p/f | p/p/p |
| | Vd | — | — | — | p/p/f | p/f/f | p/f/p |
| | Ve | — | — | — | — | p/p/f | p/p/p |
| | Vf | — | — | — | — | — | p/p/f |

8C / 8B / 8A

FIG.21
PRESET VOLTAGE Vp1=Vg, Vp2=Ve

| | | REFRESH VOLTAGE Vr | | | | | |
|---|---|---|---|---|---|---|---|
| | | Vb | Vc | Vd | Ve | Vf | Vg |
| SELECT VOLTAGE Vs | Va | f/p/p | p/p/p | p/f/p | p/p/p | p/p/f | p/p/p |
| | Vb | — | f/p/p | f/f/p | f/p/p | f/p/f | f/p/p |
| | Vc | — | — | p/f/p | p/f/p | p/p/f | p/p/p |
| | Vd | — | — | — | p/p/p | p/f/f | p/f/p |
| | Ve | — | — | — | — | p/p/f | p/p/p |
| | Vf | — | — | — | — | — | p/p/f |

8C / 8B / 8A

| REFRESH VOLTAGE | SELECT VOLTAGE | DISPLAY STATE |||
| --- | --- | --- | --- | --- |
| | | B DISPLAY LAYER | G DISPLAY LAYER | R DISPLAY LAYER |
| 700V | 0V | ON | ON | ON |
| 320V | 135V | OFF | OFF | OFF |
| 700V | 135V | ON | OFF | OFF |
| 500V | 50V | OFF | ON | OFF |
| 320V | 0V | OFF | OFF | ON |
| 700V | 50V | ON | ON | OFF |
| 700V | 150V | ON | OFF | ON |
| 500V | 0V | OFF | ON | ON |

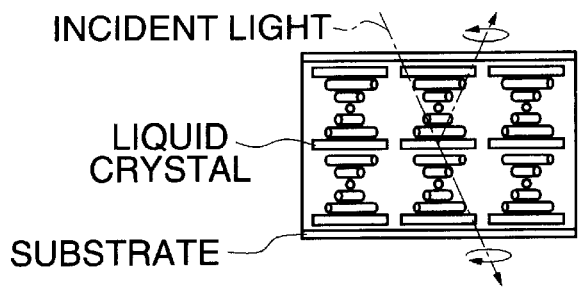
*FIG.26A*
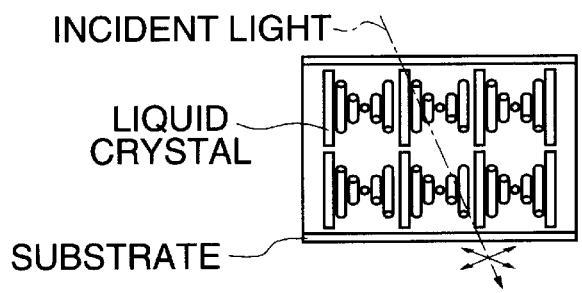
*FIG.26B*
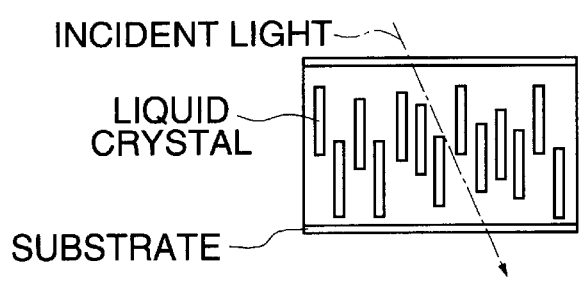
*FIG.26C*
*FIG.27*
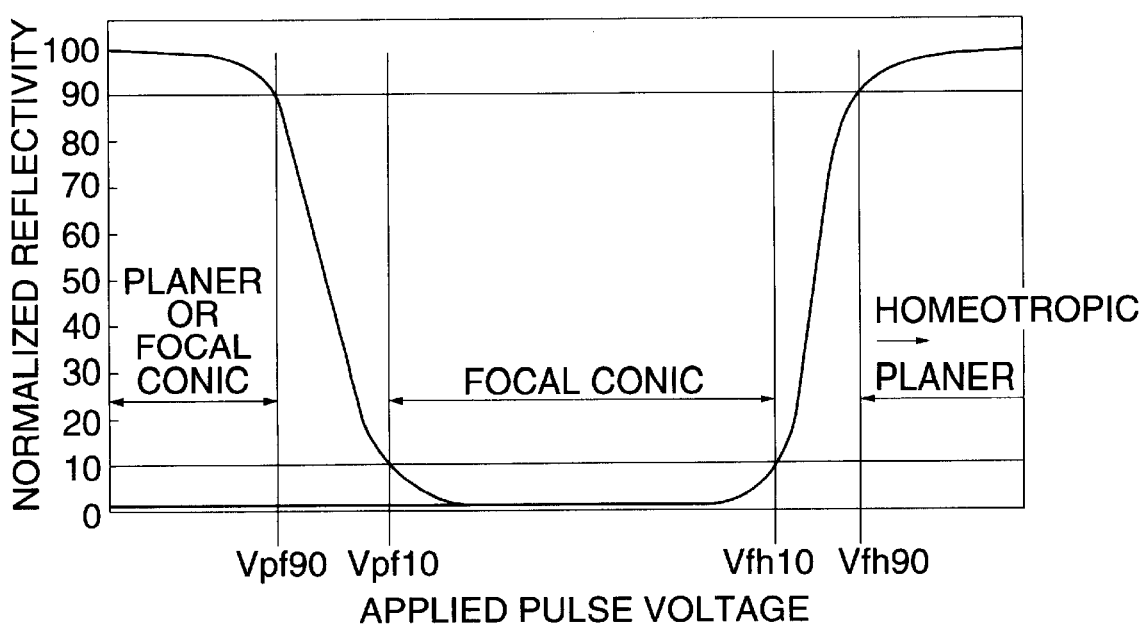

| | REFRESH VOLTAGE Vr | | | | | |
|---|---|---|---|---|---|---|
| | Vb | Vc | Vd | Ve | Vf | Vg |
| SELECT VOLTAGE Vs — Va | f/?/? | f/f/? | f/f/f BLACK | p/f/f RED | p/p/f YELLOW | p/p/p WHITE |
| Vb | — | f/f/? | f/f/f BLACK | f/f/f BLACK | f/p/f GREEN | f/p/p CYAN |
| Vc | — | — | f/f/f BLACK | f/f/f BLACK | f/f/f BLACK | f/f/p BLUE |
| Vd | — | — | — | f/f/f BLACK | f/f/f BLACK | f/f/f BLACK |
| Ve | — | — | — | — | p/f/f RED | p/f/f RED |
| Vf | — | — | — | — | — | p/p/f YELLOW |

38C / 38B / 38A

DISPLAY ELEMENT, WRITING METHOD AND WRITING APPARATUS

BACKGROUND OF THE INVENTION

1. Field of the Invention

The present invention relates to a display element capable of displaying multiple colors, a method of writing images to it, and an apparatus for writing images.

2. Description of the Prior Art

A reflective liquid crystal is suitable as a display element of small-size information equipment, portable information terminals and the like because it does not require a dedicated light source such as backlight, has low power consumption, and can be of a thin and lightweight construction.

There is known a reflective liquid crystal element capable of displaying multiple colors that, between a pair of substrates each having an electrode formed on an inner surface thereof, three liquid crystal cells forming display layers having cholesteric liquid crystals selectively reflecting blue, green, and red lights are stacked, and a light absorption layer is formed on the back of a liquid crystal cell opposite to a display side (a side through which outside light comes).

In the cholesteric liquid crystal display element of cell stacking type, by independently having the cholesteric liquid crystals of cells switch between a selective reflection state due to a planar state and a transmission state due to a focal conic state, eight colors—white, black, blue, green, red, cyan, magenta, and yellow—can be displayed within one pixel, and a display with low loss of light and high contrast can be obtained because no color filter is used.

However, the cholesteric liquid crystal display element of cell stacking type has the disadvantages that parallax becomes high because there are a substrate and an electrode between display layers of different colors and the interval between the display layers becomes large, and the display element and a display apparatus are expensive to fabricate because driving electrodes and driving circuits for three colors are required.

A cholesteric liquid crystal display element capable of displaying multiple colors is proposed in Japanese Published Unexamined Patent Application No. Hei 10-177191 (hereinafter referred to as a first conventional example) and Japanese Published Unexamined Patent Application No. Hei 11-149088 (U.S. patent application Ser. No. 09/192,402, hereinafter referred to as a second conventional example). According to the proposed cholesteric liquid crystal display element, three display layers having cholesteric liquid crystals selectively reflecting blue, green, and red lights are stacked between a pair of substrates each having an electrode formed on an inner surface thereof, and an image is written and displayed by applying a writing signal from the outside of the three display layers.

FIG. 28 shows a first conventional example. In a display element 31 of this example, between a substrate 32 having a writing electrode 34 formed on an inner surface thereof and a substrate 33 having a writing electrode 35 formed on an inner surface thereof, three display layers 38A, 38B, and 38C of PDLC (Polymer Dispersed Liquid Crystal) in which cholesteric liquid crystals 41A, 41B, and 41C selectively reflecting mutually different color lights are respectively droplet-dispersed in polymeric matrix 42 are stacked, and a light absorption layer 39 is formed on the back of a substrate 33 of a non-display side. Threshold voltages of orientation changes of the cholesteric liquid crystals 41A, 41B, and 41C are set as described later. The writing electrodes 34 and 35 are connected to a writing apparatus (driving circuit) 50.

FIG. 29 shows a second conventional example. In the display element 31 of this example, between the substrates 32 and 33, three display layers 38A, 38B, and 38C having the cholesteric liquid crystals 41A, 41B, and 41C selectively reflecting mutually different color lights are stacked in a way that inserts spacers 37A, 37B, and 37C into the display layers 38A, 38B, and 38C, respectively, and puts a separating substrate 36A between the display layers 38A and 38B and a separating substrate 36B between the display layers 38B and 38C, and the light absorption layer 39 is formed on the back of the substrate 33 of the non-display side. Threshold voltages of orientation changes of the cholesteric liquid crystals 41A, 41B, and 41C are set as described later. The writing apparatus 50, which is formed separately from the display element 31, includes the electrodes 54 and 55 sandwiching the display element 31, and a driving circuit 51 for applying a writing signal between the electrodes 54 and 55.

A cholesteric liquid crystal having positive dielectric anisotropy has three states: a planar state in which helical axes are vertical to cell surfaces and which causes a selective reflection phenomenon for incident light, as shown in FIG. 26A; a focal conic state in which helical axes are almost parallel to cell surfaces and which causes incident light to transmit while scattering a little forward, as shown in FIG. 26B; and a homeotropic state in which a helical structure collapses and liquid crystal directors face a field direction and which causes incident light to transmit almost perfectly, as shown in FIG. 26C.

The planar state and the focal conic state of the three states can exist bistably when no electric field is applied. Therefore, the orientation states of cholesteric liquid crystals are not uniquely determined for electric fields; when an initial state is the planar state, as an applied voltage increases, the cholesteric liquid crystals change in the order of the planar, focal conic, and homeotropic states; and when an initial state is the focal state, as an applied voltage increases, the cholesteric liquid crystals change in the order of the focal conic and homeotropic states. On the other hand, if an electric field is suddenly set to zero, the planar and focal conic states remain unchanged, and the homeotropic state changes to the planar state.

Therefore, immediately after a pulse signal is applied, the cholesteric liquid crystal layers exhibit an electo-optical response as shown in FIG. 27; when an applied pulse voltage is Vfh90 or more, it enters a selective reflection state representing a change from the homeotropic state to the planar state; and when an applied pulse voltage is between Vpf10 and Vfh10, it enters a transmission state due to the focal conic state; and when an applied pulse voltage is Vfh90 or less, it maintains the state in which it was before the pulse signal is applied, that is, enters the selective reflection state due to the planar state or the transmission state due to the focal conic state.

In the figure, the vertical axis represents normalized reflectivity and normalizes reflectivity by a maximum reflectivity of 100 and a minimum reflectivity of 0. Since change of reflectivity entails a transition area, a normalized reflectivity of 90 or more is defined as a selective reflection state; a normalized reflectivity of 10 or less, as a transmission state; threshold voltages of change between the planar state and the focal conic state, as Vpf90 before a transition area and Vpf10 after it; and threshold voltages of change between the focal conic state and the homeotropic state, as Vfh10 before a transition area and Vfh90 after it.

In the conventional display element 31 shown in FIGS. 28 and 29, these threshold voltages are mutually changed among the display layers 38A, 38B, and 38C. Specifically, assuming that threshold voltages of the display layer 38A are Vpf90(A), Vpf10(A), Vfh10(A), and Vfh90(A); threshold voltages of the display layer 38B are Vpf90(B), Vpf10(B), Vfh10(B), and Vfh90(B); and threshold voltages of the display layer 38C are Vpf90(C), Vpf10(C), Vfh10(C), and Vfh90(C), an expression (6) shown below is set.

$$Vpf90(C)<Vpf10(C)<Vpf90(B)<Vpf10(B)<Vpf90(A)<Vpf10(A)<Vfh10(C)<Vfh90(C)<Vfh10(B)<Vfh90(B)<Vfh10(A)<Vfh90(A) \qquad (1)$$

The order in which the display layers are stacked is not limited to the examples of FIGS. 28 and 29. That is, regardless of the order in which the display layers are stacked, when the three display layers are defined as 38A, 38B, and 38C in descending order of threshold voltages Vpf90, Vpf10, Vfh10, and Vfh90, arrangements are made so that the following expression is satisfied $$Vpf10(A)<Vfh10(C) \qquad (1a)$$

and there are no other threshold voltages between both.

When there are a refresh period Tr, a select period Ts, and a following non-voltage display period Td as shown in FIG. 31, by the writing apparatus 50, a writing signal representing a voltage selected from the above-described seven voltage levels Va to Vg demarcated by the threshold voltages as shown in FIG. 30, based on input image data, is applied between the writing electrodes 34 and 35 or between the electrodes 54 and 55, holding the relation that a voltage Vr in the refresh period Tr is greater than a voltage Vs in the select period Ts.

FIG. 32 shows, in this case, the orientation states of the display layers 38A, 38B, and 38C by combinations of refresh voltage Vr and select voltage Vs, wherein "p" designates a selective reflection state due to a planar state; "f", a transmission state due to a focal conic state; and "?",an undecided state depending on a state before a write signal is applied. The orientation states indicate the display layers 38C, 38B, and 38A from the left in that order.

As is apparent from the above, according to the conventional display element 31, the following seven types of orientation states are obtained.

(1) All of the display layers 38A, 38B, and 38C are the planar state.
(2) All of the display layers 38A, 38B, and 38C are the focal conic state.
(3) The display layer 38A is the planar state, and the display layers 38B and 38C are the focal conic state.
(4) The display layer 38B is the planar state, and the display layers 38A and 38C are the focal conic state.
(5) The display layer 38C is the planar state, and the display layers 38A and 38B are the focal conic state.
(6) The display layers 38A and 38B are the planar state, and the display layer 38C is the focal conic state.
(7) The display layers 38B and 38C are the planar state, and the display layer 38A is the focal conic state.

Therefore, for example, on the assumption that the display layers 38A, 38B, and 38C selectively reflect blue light, green light, and red light, respectively, as shown in FIG. 32, the display element can assume the following seven display states, so that the five colors of white, black, blue, green and red, and the two colors of cyan and yellow, or seven colors in total can be displayed within one pixel.

(1) White is displayed by a writing signal satisfying relations of Vr=Vg and Vs=Va.
(2) Black is displayed by, e.g., a writing signal satisfying relations of Vr=Vd and Vs=Va.
(3) Blue is displayed by a writing signal satisfying relations of Vr=Vg and Vs=Vc.
(4) Green is displayed by a writing signal satisfying relations of Vr=Vf and Vs=Vb.
(5) Red is displayed by, e.g., a writing signal satisfying relations of Vr=Ve and Vs=Va.
(6) Cyan is displayed by a writing signal satisfying relations of Vr=Vg and Vs=Vb.
(7) Yellow is displayed by, e.g., a writing signal satisfying relations of Vr=Vf and Vs=Va.

In the above example, assuming that the display layer 38B having intermediate threshold voltages selectively reflects green light, cyan and yellow are displayed as two colors of cyan, yellow, and magenta. However, if it is assumed that the display layer 38B having intermediate threshold voltages selectively reflects blue light, cyan and magenta can be displayed as two colors of cyan, yellow, and magenta, and if it is assumed that the display layer 38B having intermediate threshold voltages selectively reflects red light, yellow and magenta can be displayed as two colors of cyan, yellow, and magenta.

In the conventional display element 31, except for the thin separating substrates 36A and 36B of the example of FIG. 29, no substrate and electrode are provided between the display layers 38A, 38B, and 38C so that the intervals between the display layers 38A, 38B, and 38C become zero or very small, with the result of low parallax and reduced costs of fabricating the display element and display apparatus because the writing electrodes and the driving circuit are made common among the display layers 38A, 38B, and 38C.

However, the above-described conventional display element 31 has the disadvantages that combinations of orientation states of cholesteric liquid crystals 41A, 41B, and 41C of the display layers 38A, 38B, and 38C, determined by refresh voltage Vr and select voltage Vs, are no more than seven types, and the five colors of white, black, blue, green and red, and two colors of cyan, yellow, and magenta, which are determined by the relationship between the magnitude of threshold voltages of the cholesteric liquid crystals 41A, 41B, and 41C and selectively reflected colors, that is, no more than seven colors in total can be displayed, indicating a narrow color reproduction area (color reproduction range).

SUMMARY OF THE INVENTION

Accordingly, according to the present invention, in a display element in which three or more display layers for displaying mutually different color lights are stacked within one pixel and which controls display states of the display layers by applying a voltage from the outside of the display layers, eight colors—white, black, blue, green, red, cyan, magenta, and yellow—can be displayed within one pixel, and a color reproduction area can be enlarged.

An aspect of the present invention relates to a display element having three or more display layers each including cholesteric liquid crystal. The display layers selectively reflect lights of different peak wavelengths, respectively. The layers are stacked within one pixel and have a threshold voltage of orientation change of the cholesteric liquid crystals differing from each other for voltage applied from the outside of the plural display layers. Among the three or more display layers, a threshold voltage of change from a planar state to a focal conic state of the display layer having the highest threshold voltage is higher than a threshold voltage of change from a focal conic state to a homeotropic state of the display layer having the lowest threshold voltage.

Another aspect of the present invention relates to a method of writing an image to the display element of the present invention by applying a writing signal which includes at least a refresh period, a select period, and a following non-voltage display period. A voltage Vr in the refresh period is greater than a voltage Vs in the select period.

Another aspect of the present invention relates to a display element having three or more display layers including cholesteric liquid crystals selectively absorbing lights of different peak wavelengths, respectively, by adding dichroic dyes to the cholesteric liquid crystals or by the dichroism of the cholesteric liquid crystals themselves. The display layers are stacked within one pixel, and have a threshold voltage of orientation change of the cholesteric liquid crystals differing from each other for voltage applied from the outside of the display layers. Among the three or more display layers, a threshold voltage of change from a planar state to a focal conic state of the display layer having the highest threshold voltage is higher than a threshold voltage of change from a focal conic state to a homeotropic state of the display layer having the lowest threshold voltage. In the display element of the present invention configured as described above, for voltages applied from the outside of the plural stacked display layers, a threshold voltage Vpf90(A) of change from a planar state to a focal conic state of the display layer A having the highest threshold voltage of the three or more display layers A, B, C, . . . is higher than a threshold voltage Vfh90(C) of change from a focal conic state to a homeotropic state of the display layer C having the lowest threshold voltage.

For this reason, by applying a voltage between the two threshold voltages Vpf90(A) and Vfh90(C) to the whole of the plural stacked display layers, orientation states not found in conventional display elements with threshold voltages set as shown in FIG. 30 are obtained so that the display layer A having the highest threshold voltage of the display layers A, B, C, . . . and the display layer C having the smallest threshold voltage go to a planar state and the display layer B having intermediate threshold voltages goes to a focal conic state, so that eight colors—white, black, blue, green, red, cyan, magenta, and yellow—can be displayed within one pixel, and a color reproduction area can be enlarged.

BRIEF DESCRIPTION OF THE DRAWINGS

Preferred embodiments of the present invention will be described in detail based on the followings, wherein:

FIG. 13 is a view showing display states of the display element of the first embodiment;

FIG. 14 is a view showing display states of the display element of the second embodiment;

FIG. 19 is a view showing a writing signal to the display element exhibiting the electro-optical responses of FIG. 18;

FIG. 20 is a view showing the orientation states of the display element exhibiting the electro-optical responses of FIG. 18;

FIG. 21 is a view showing the orientation states of the display element exhibiting the electro-optical responses of FIG. 18;

FIG. 26 is a view showing orientation change of a cholesteric liquid crystal having positive dielectric anisotropy;

FIG. 27 is a view showing electo-optical responses of a cholesteric liquid crystal having positive dielectric anisotropy;

DESCRIPTION OF THE PREFERRED EMBODIMENTS

First Embodiment

As a first embodiment, a concrete example of making a display by selective reflection of cholesteric liquid crystals will be described.

First Embodiment

Figure 1:
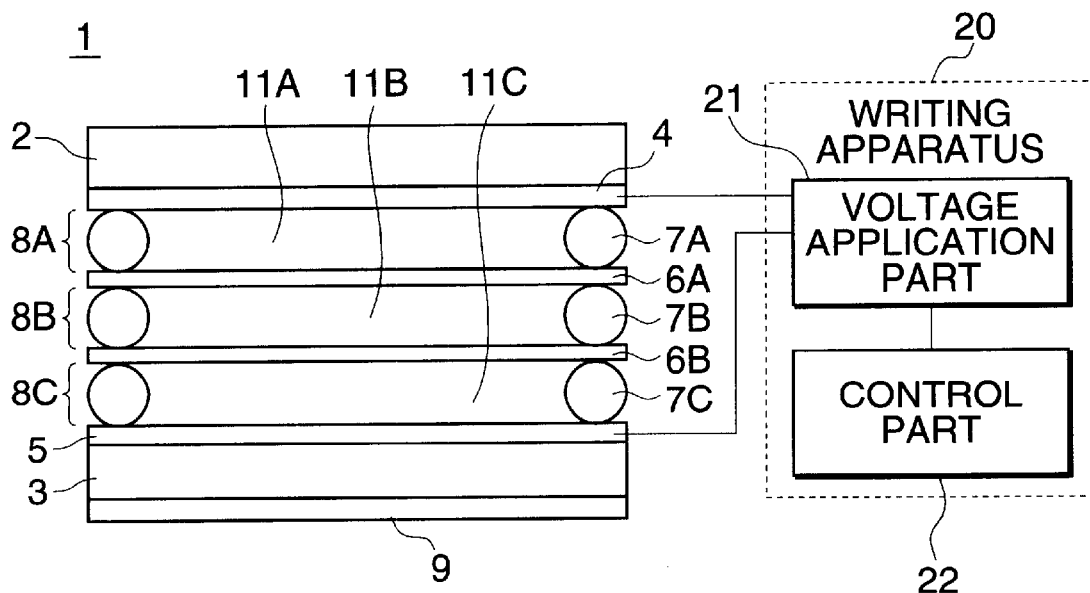
FIG. 1 is a view showing a first example of a first embodiment.

FIG. 1 shows a first example of the first embodiment.

A display element 1 of this example has three display layers 8A, 8B, and 8C including cholesteric liquid crystals (including chiral nematic liquid crystals or chiral smectic liquid crystals) 11A, 11B, and 11C selectively reflecting mutually different color lights between a substrate 2 having a writing electrode 4 on an inner surface thereof and a substrate 3 having a writing electrode 5 on an inner surface thereof, wherein the display layers 8A, 8B, and 8C are stacked on top of each other with spacers 7A, 7B, and 7C being inserted in the display layers 8A, 8B, and 8C, respectively, and with a separating substrate 6A intervening between the display layers 8A and 8B and a separating substrate 6B intervening between the display layers 8B and 8C, and wherein a light absorption layer 9 is formed on the back of the substrate 3 of a non-display side. The writing electrodes 4 and 5 are connected to a writing apparatus 20.

The substrates 2 and 3 are made of glass, silicon, or polymeric films such as polyester (polyethylene terephthalate), polyether sulfone and polycarbonate, and at least the substrate 2 of a display side is made of materials having light permeability. As required, a known functional film such as a wear-resistant layer or a barrier layer to prevent gas from invading to the display element 1 may be formed on the surfaces of the substrates 2 and 3.

The writing electrodes 4 and 5 are made of an indium tin oxide (ITO) film or the like, and at least the writing electrode 4 of the display side is made of a material having light permeability. As required, a known functional film such as a liquid crystal orientation film and an insulating film may be formed on the surfaces of the writing electrodes 4 and 5.

As the configuration and the driving system of the writing electrodes 4 and 5, any of the following is practicable: (1) a segment driving system in which one of the writing electrodes 4 and 5 is an electrode common to pixels and the other is an electrode specific to the pixels; (2) a simple matrix driving system in which the writing electrodes 4 and 5 are respectively formed in stripe shape in a direction perpendicular to each other and an intersection of both is defined as one pixel; and (3) an active matrix driving system in which one of the writing electrodes 4 and 5 is an electrode common to the pixels and the other consists of a scanning electrode and a signal electrode in stripe shape which are perpendicular to each other, provided with an active element such as TFT and MIM. The same is also true for examples in FIG. 2 and following drawings.

For the separating substrates 6A and 6B, the same polymeric films as for the substrates 2 and 3 can be used and they are made of materials having light permeability. It is desirable that they are several micrometers to several tens of micrometers in thickness and have flexibility. To increase the ratio of divided voltages to the display layer 8A, 8B, and 8C, as large a dielectric constant as possible is desirable. As required, a known functional film such as a liquid crystal orientation film may be formed on their surfaces.

For the spacers 7A, 7B, and 7C, ball-type or cylinder-type spacers made of glass or plastic can be used, and they respectively control the thickness of the display layers 8A, 8B, and 8C to several micrometers to several tens of micrometers. Particularly, when materials having flexibility are used for the substrates 2 and 3, in order to prevent the thicknesses of the display layers 8A, 8B, and 8C from changing highly due to the deformation of the substrates 2 and 3, it is desirable that the substrates are bonded to each other using the spacers 7A, 7B, and 7C coated with an adhesive component in the vicinity thereof, or movement of the spacers 7A, 7B, and 7C is prevented.

Instead of the spacers 7A, 7B, and 7C, saliences or the like capable of controlling the thicknesses of the display layers 8A, 8B, and 8C may be formed on the surfaces of the substrates 2 and 3, and the separating substrates 6A and 6B.

The light absorption layer 9 is not limited to specific one if it can absorb incident light transmitting through the display layers 8A, 8B, and 8C. Instead of forming the light absorption layer 9 on the back of the substrate 3 of the non-display side, the substrate 3 or the writing electrode 5 may be provided with light absorbency to eliminate the light absorption layer 9.

The cholesteric liquid crystals 11A, 11B, and 11C each have positive dielectric anisotropy and selectively reflect lights of mutually different peak wavelengths. The display layers 8A, 8B, and 8C can be constituted by cholesteric liquid crystals and polymeric complexes, or mixed materials of cholesteric liquid crystals and pigments.

As the cholesteric liquid crystals 11A, 11B, and 11C, the following materials can be used: steroid cholesterol derivatives; chiral substances of Schiff base family, azo family, ester family, and biphenyl family having asymmetry carbons; or materials with these chiral substances added to nematic crystal liquids such as Schiff base family, azo family, azoxy family, ethane family, biphenyl family, terphenyl family, cyclohexyl carboxylic acid ester family, phenylcyclohexane family, benzoate ester family, pyrimidine family, dioxane family, tolan family, cyclohexyl cyclohexane ester family, and alkenyl family, or mixtures of these.

If the cholesteric liquid crystals have positive dielectric anisotropy, nematic liquid crystals having negative dielectric anisotropy can also be used.

Reflection peak wavelengths of the display layers 8A, 8B, and 8C are controlled by, e.g., the helical pitch of the cholesteric liquid crystals 11A, 11B, and 11C. The helical pitch of the cholesteric liquid crystals 11A, 11B, and 11C can be adjusted by the chemical structure of the respective chiral substances and the ratio of additives to the nematic liquid crystals of the chiral substances.

The relationship of threshold voltages of orientation change of the cholesteric liquid crystals 11A, 11B, and 11C will be described later.

The writing apparatus 20, in this example, includes a voltage application part 21 that applies a writing signal between the writing electrodes 4 and 5 of the display element 1, and a control part 22 that controls the writing signal, based on input image data. The mode of the writing signal will be described later.

Second Example

Figure 2:
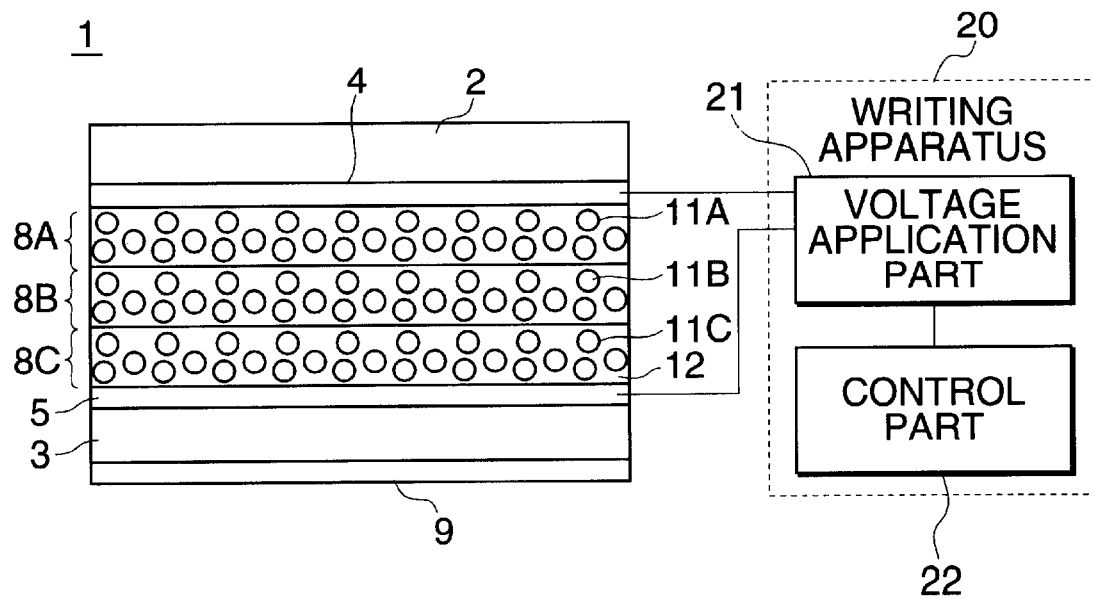
FIG. 2 is a view showing a second example of the first embodiment.

FIG. 2 shows a second example of the first embodiment.

In this example, the display layers 8A, 8B, and 8C each have a PDLC structure in which the cholesteric liquid crystals 11A, 11B, and 11C are droplet-dispersed in a polymeric matrix 12. With the PDLC structure, the cholesteric liquid crystals 11A, 11B, and 11C constituting the display layers 8A, 8B, and 8C do not mix with each other and the separating substrates 6A and 6B can be eliminated. This example is the same as the example of FIG. 1 in other points.

The PDLC structure can be formed by known methods such as the emulsion method, the PIPS (Polymerization Induced Phase Separation) method, the TIPS (Thermally Induced Phase Separation) method, and the SIPS (Solvent Induced Phase Separation) method, and the display layers 8A, 8B, and 8C are sequentially formed by the printing method or the like.

Third Embodiment

Figure 3:
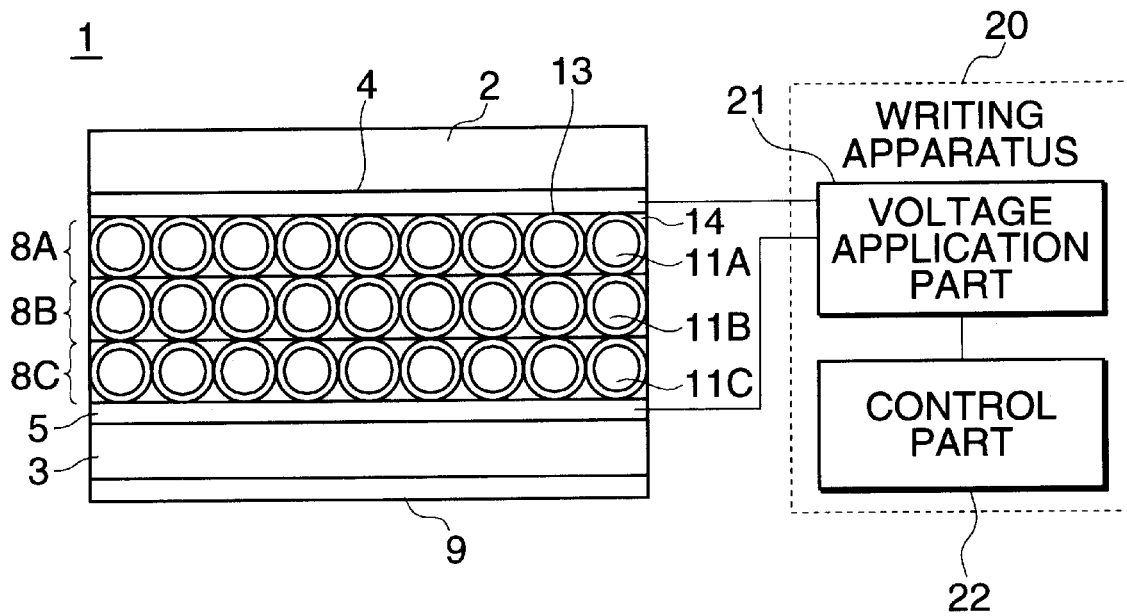
FIG. 3 is a view showing a third example of the first embodiment.

FIG. 3 shows a third example of the first embodiment.

In this example, the cholesteric liquid crystals 11A, 11B, and 11C constituting the display layers 8A, 8B, and 8C are transformed in advance into micro capsules 13 each confined in a polymeric film and are mixed with a solvent and binder 14 as required, and then the display layers 8A, 8B, and 8C are sequentially formed by the printing method or the like. This example is the same as the example of FIG. 1 in other points.

Although the micro capsules 13 can be formed by known methods such as the phase separation (coacervation) method, the interfacial polymerization method, the solvent removal method, and the in-situ polymerization method, it is desirable that their diameters are made as uniform as possible.

Fourth Example

Figure 4:
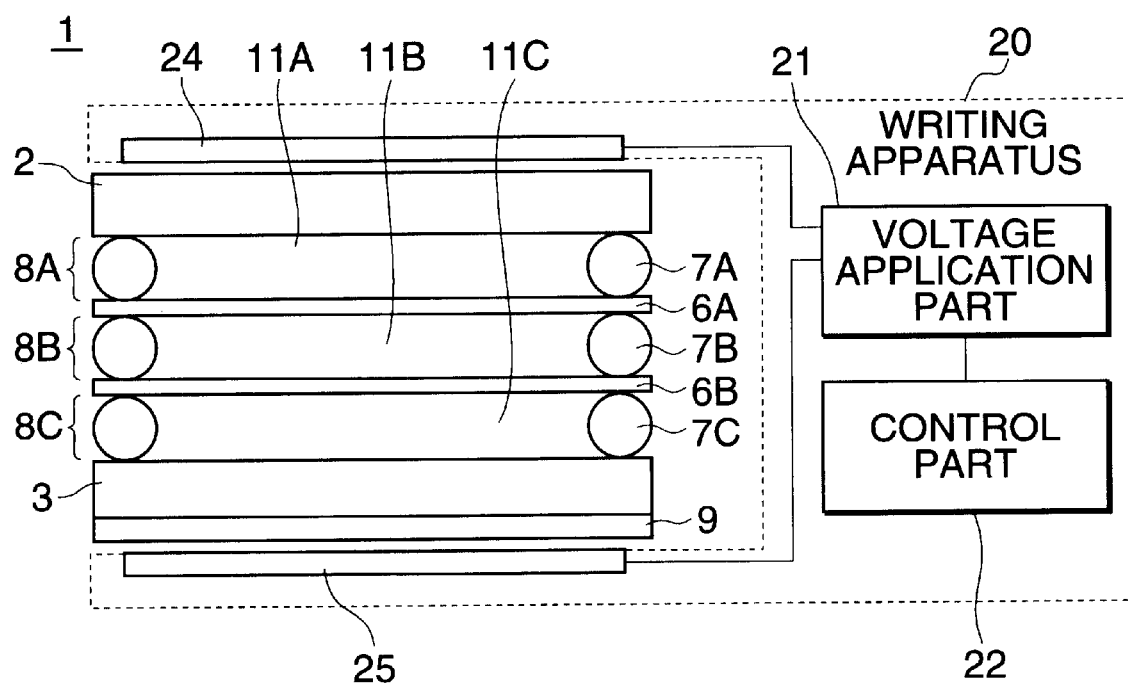
FIG. 4 is a view showing a fourth example of the first embodiment.

FIG. 4 shows a fourth example of the first embodiment.

In this example, the display element 1 does not internally have the electrodes 4 and 5, while the writing apparatus 20 is separate from the display element 1 and includes the writing electrodes 24 and 25 holding the display element 1 between them, the voltage application part 21, and the control part 22. Thereby, a writing signal can be applied to the display layers 8A, 8B, and 8C from the outside of the display element 1, so that the display element 1 can be made paper-like.

To increase the ratio of divided voltages to the display layer 8A, 8B, and 8C, it is desirable that the substrates 2 and 3 and the light absorption layer 9 have as large a dielectric constant as possible, like the separating substrates 6A and 6B.

The display layers 8A, 8B, and 8C may have the same PDLC structure as those in the example of FIG. 2, or may have the same micro capsule structure as those in the example of FIG. 3.

Fifth Example

Figure 5:
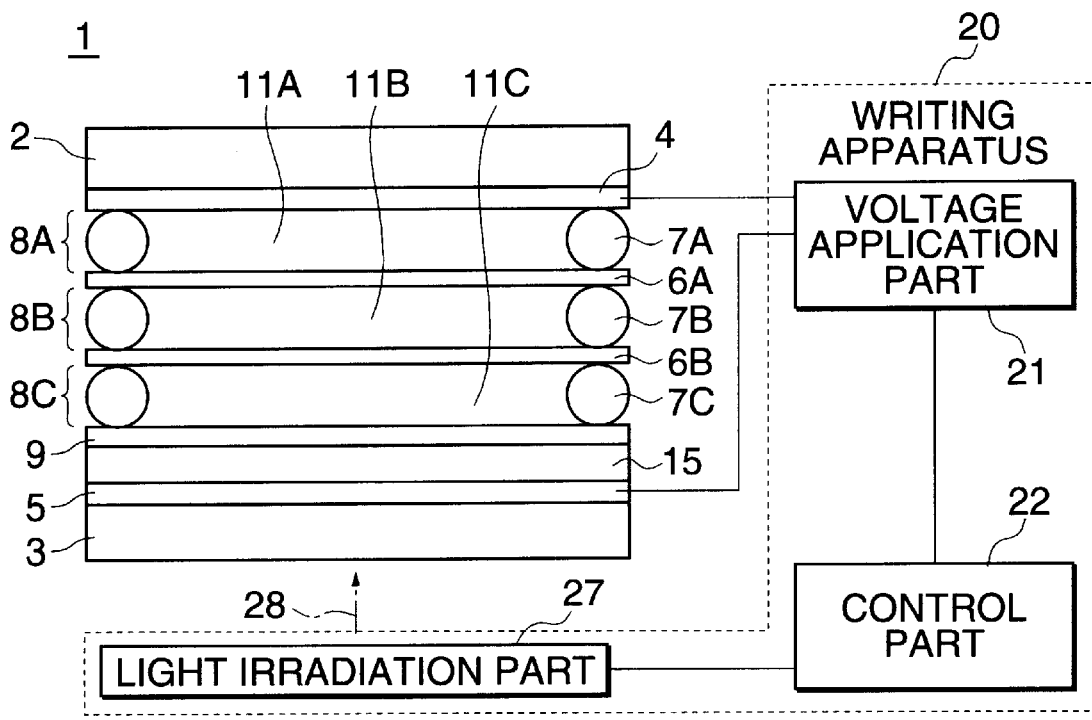
FIG. 5 is a view showing a fifth example of the first embodiment.

FIG. 5 shows a fifth example of the first embodiment.

In this example, the display element 1 has the display layers 8A, 8B, and 8C, the light absorption layer 9, and a photoconductive layer 15 stacked on top of each other between the substrates 2 and 3 having the electrode 4 or 5 formed on an inner surface thereof, while the writing apparatus 20 includes the voltage application part 21, the control part 22, and a light irradiation part 27 that irradiates the photoconductive layer 15 with a writing light 28 through the substrate 3 and the writing electrode 5 of the display element 1, wherein the writing apparatus 20 controls electric fields applied to the display layers 8A, 8B, and 8C in combination of the writing light 28 and a writing signal applied across the writing electrodes 4 and 5 from the voltage application part 21.

In this example, the substrate 3 and the writing electrode 5 of the non-display side are also made of materials having light permeability. To increase the ratio of divided voltages to the display layer 8A, 8B, and 8C, it is desirable that the light absorption layer 9 has as large a dielectric constant as possible.

Preferably, the photoconductive layer 15 changes in impedance according to the amount of irradiated light; the following can be used for the photoconductive layer 15: a film produced by subjecting a charge generation substance to the evaporation method, sputtering method, ion plating method, CVD method, or the like; a coat of a charge generation substance dispersed across a resin binder, produced by the bar coat method, spin coat method, roll coat method, dip method, casting method, or the like; or a charge transport layer stacked on these charge generation layers.

Preferably, the light irradiation part 27 can irradiate the non-display side of the display element 1 with any amount of the writing light 28; the following can be used for the light irradiation part 27: a self-generating light element such as a laser beam scanner, LED array, plasma display, EL display, or the like; and a combination of a light-adjusting element such as a liquid crystal shutter, and a light source such as a fluorescent tube, xenon lamp, halogen lamp, or mercury lamp.

The display layers 8A, 8B, and 8C may have the same PDLC structure as those in the example of FIG. 2, or may have the same micro capsule structure as those in the example of FIG. 3.

Second Embodiment

As a second embodiment, there is shown a concrete example of making a display by selective absorption of dichroic dyes added to cholesteric liquid crystals.

First Example

Figure 6:
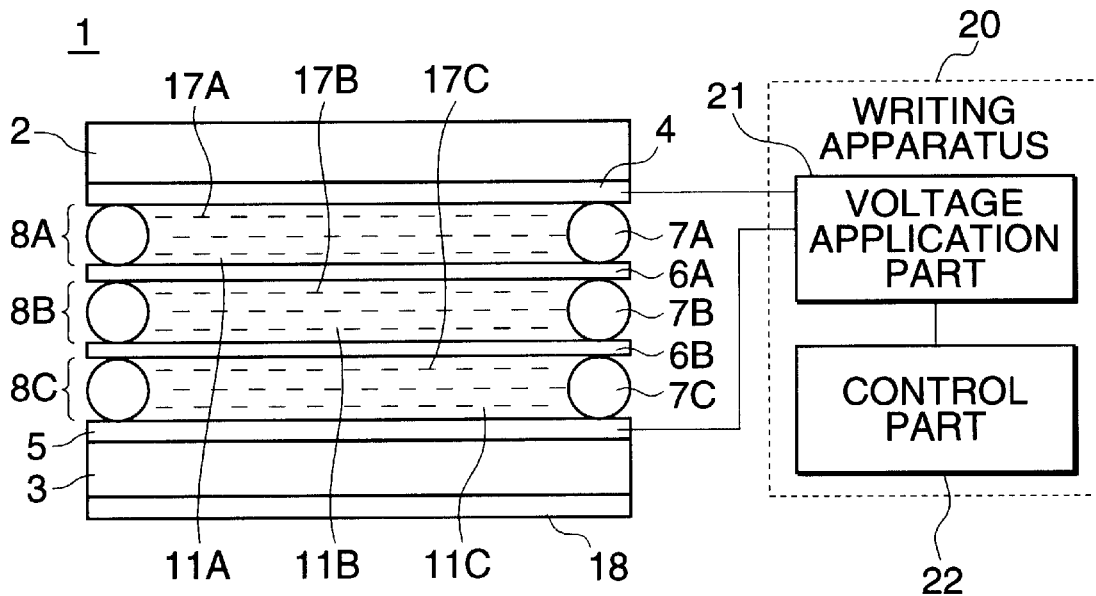
FIG. 6 is a view showing a first example of the second embodiment.

FIG. 6 shows a first example of a second embodiment.

In this example, the display layers 8A, 8B, and 8C are cholesteric liquid crystals 11A, 11B, and 11C to which dichroic dyes 17A, 17B, and 17C selectively absorbing mutually different color lights are added, and on the back of the substrate 3 of the non-display side, a light scattering layer 18 is formed instead of a light absorption layer.

Like the first embodiment, the cholesteric liquid crystals 11A, 11B, and 11C each have positive dielectric anisotropy. However, since a display is made by selective absorption of the dichroic dyes 17A, 17B, and 17C, it is desirable that selective reflection wavelength areas of the cholesteric liquid crystals 11A, 11B, and 11C are different from selective absorption wavelength areas of the dichroic dyes 17A, 17B, and 17C; for example, infrared radiation is desirable.

The relationship of threshold voltages of orientation change of the cholesteric liquid crystals 11A, 11B, and 11C will be described later.

As the dichroic dyes 17A, 17B, and 17C, positive dichroic dyes that a light absorption index in a molecular long axis direction is larger than that in a molecular short axis direction are used. Specifically, as the dichroic dyes 17A, 17B, and 17C, azo-family and anthraquinone-family pigments and other pigments can be used.

The light scattering layer 18 is not limited to specific one if it scatteredly reflects incident light transmitting through the display layers 8A, 8B, and 8C. Instead of forming the light scattering layer 18 on the back of the substrate 3 of the non-display side, the substrate 3 or the writing electrode 5 may be provided with light scattering capability to eliminate the light scattering layer 18.

This example is the same as the example of FIG. 1 of the first embodiment in other points. The display layers 8A, 8B, and 8C may have the same PDLC structure as those in the example of FIG. 2, or may have the same micro capsule structure as those in the example of FIG. 3. In this case, the dichroic dyes are added to droplet-dispersed cholesteric liquid crystals or contained in the micro capsules after being added to the cholesteric liquid crystals.

Second Example

Figure 7:
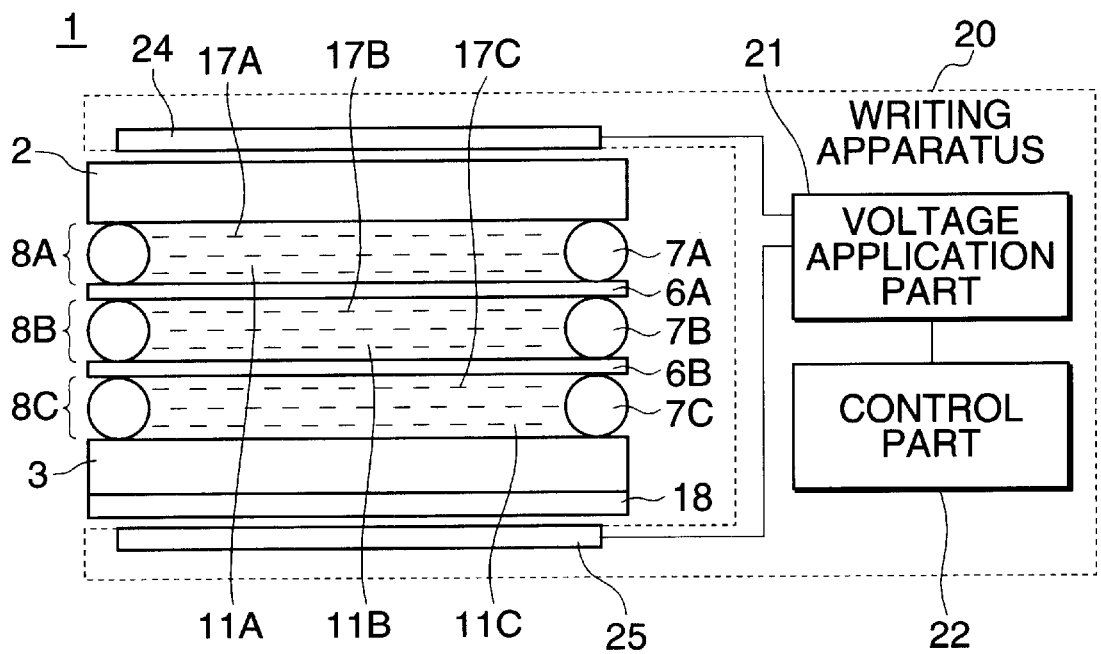
FIG. 7 is a view showing a second example of the second embodiment.

FIG. 7 shows a second example of the second embodiment.

This example shows an external writing method as shown in the example of FIG. 4 of the first embodiment, combined with the example of FIG. 6. That is, in this example, the display layers 8A, 8B, and 8C include the cholesteric liquid crystals 11A, 11B, and 11C to which dichroic dyes 17A, 17B, and 17C selectively selecting mutually different color lights are added, the light scattering layer 18 is formed on the back of the substrate 3 of the non-display side, and writing electrodes 24 and 25 are provided in the writing apparatus 20, which is separate from the display element 1, to apply a writing signal to the display layers 8A, 8B, and 8C from the outside of the display element 1.

To increase the ratio of divided voltages to the display layer 8A, 8B, and 8C, it is desirable that the substrates 2 and 3 and the light scattering layer 18 have as large a dielectric constant as possible, like the separating substrates 6A and 6B.

The display layers 8A, 8B, and 8C may have the PDLC structure or micro capsule structure.

Third Example

Figure 8:
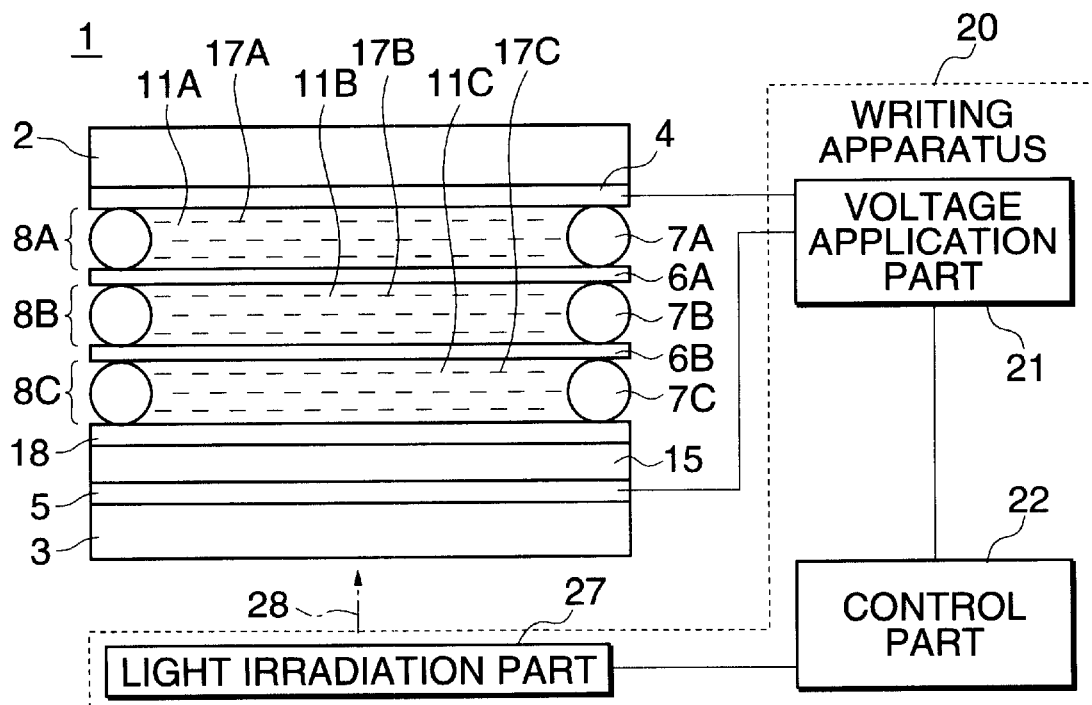
FIG. 8 is a view showing a third example of the second embodiment.

FIG. 8 shows a third example of the second embodiment.

This example shows a light combined writing method as shown in the example of FIG. 5 of the first embodiment, combined with the example of FIG. 6. That is, in this example, the display element 1 has the display layers 8A, 8B, and 8C, the light scattering layer 18, and the photoconductive layer 15 stacked on top of each other between the substrates 2 and 3 having the electrode 4 or 5 formed on an inner surface thereof, wherein the display layers 8A, 8B, and 8C include cholesteric liquid crystals 11A, 11B, and 11C to which dichroic dyes 17A, 17B, and 17C are added, while the writing apparatus 20 includes the light irradiation part 27 that irradiates the photoconductive layer 15 with a writing light 28.

In this example, the substrate 3 and the writing electrode 5 of the non-display side are made of materials having light permeability. To increase the ratio of divided voltages to the display layer 8A, 8B, and 8C, it is desirable that the light scattering layer 18 have as large a dielectric constant as possible.

The display layers 8A, 8B, and 8C may have the PDLC structure or micro capsule structure.

Electo-optical Response and Writing Method

As described in FIG. 26, a cholesteric liquid crystal having positive dielectric anisotropy has three states: a planar state shown in FIG. 26A; a focal conic state shown in FIG. 26B; and homeotropic state shown in FIG. 26C. Immediately after a pulse signal is applied, a cholesteric liquid crystal layer exhibits an electo-optical response as shown in FIG. 27; when an applied pulse voltage is Vfh90 or more, it enters a selective reflection state representing change from the homeotropic state to the planar state; and when an applied pulse voltage is between Vpf10 and Vfh10, it enters a transmission state due to the focal conic state; and when an applied pulse voltage is Vfh90 or less, it maintains the state in which it was before the pulse signal is applied, that is, enters the selective reflection state due to the planar state or the transmission state due to the focal conic state.

As described above, however, a normalized reflectivity of 90 or more is defined as a selective reflection state; a normalized reflectivity of 10 or less, as a transmission state; threshold voltages of change between the planar state and the focal conic state, as Vpf90 before a transition area and Vpf10 after it; and threshold voltages of change between the focal conic state and the homeotropic state, as Vfh10 before a transition area and Vfh90 after it.

Figure 9:
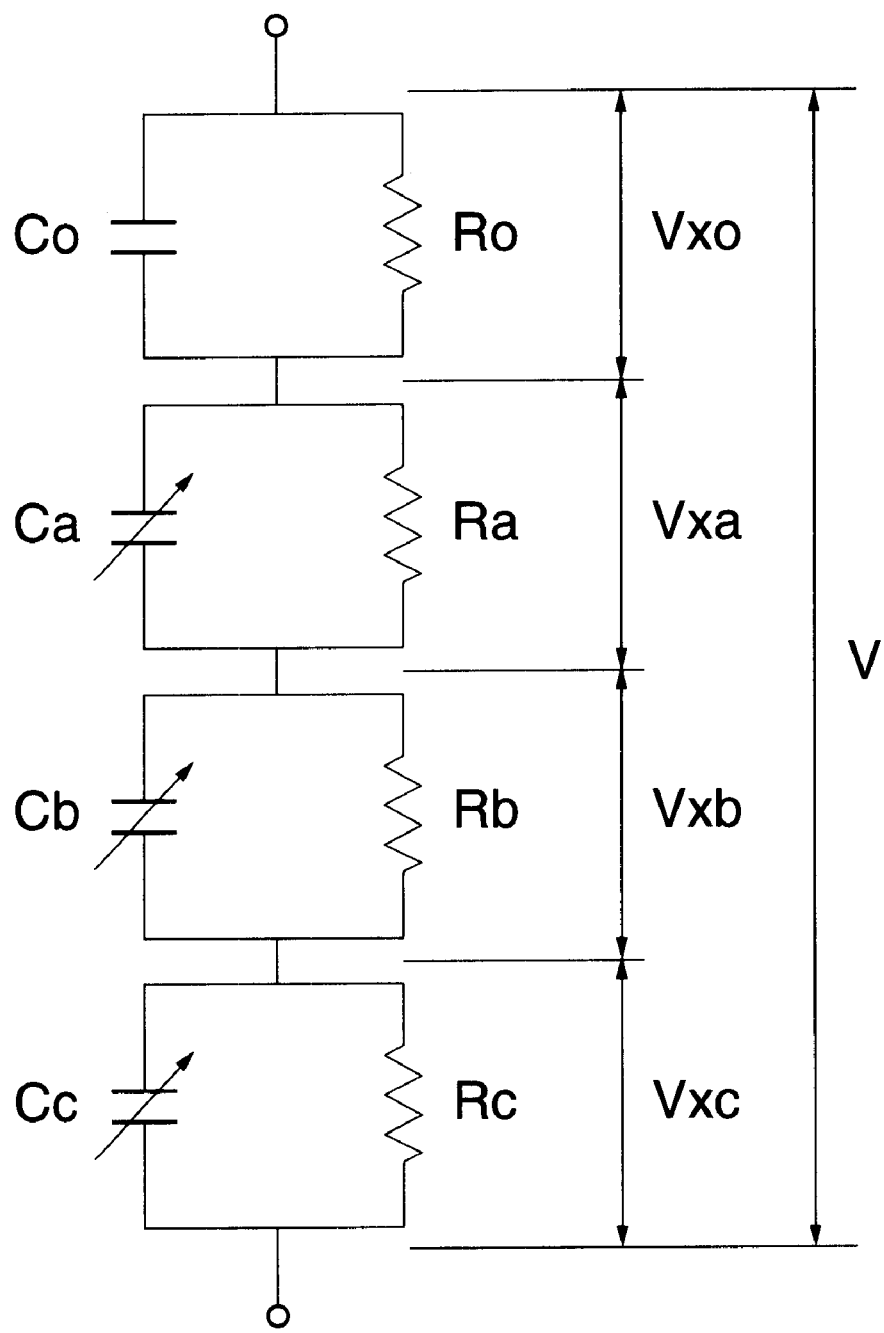
FIG. 9 is a view showing an equivalent circuit of a display element of the present invention.

FIG. 9 shows an equivalent circuit of the display elements of the examples of FIG. 1 or FIG. 6. Co and Ro designate an equivalent electrostatic capacity and an equivalent resistance value of components other than the display layers 8A, 8B, and 8C between the writing electrodes 4 and 5, that is, serial sums of electrostatic capacities and resistance values of the separating substrates 6A and 6B of the writing electrodes 4 and 5, and Vxo designates a voltage drop developing in components other than the display layers 8A, 8B, and 8C when a voltage V is applied across the writing electrodes 4 and 5 of the display element 1 from the writing apparatus 20.

Ca, Cb, and Cc, and Ra, Rb, and Rc respectively represent the electrostatic capacities and resistance values of the display layers 8A, 8B, and 8C; and Vxa, Vxb, and Vxc respectively designate voltages actually applied to the display layers 8A, 8B, and 8C. Usually, the resistance values Ra, Rb, and Rc of the display layers 8A, 8B, and 8C are sufficiently large and the electrostatic capacities Ca, Cb, and Cc change depending on the orientation of liquid crystals because the liquid crystals have dielectric anisotropy.

When a voltage V is applied across the writing electrodes 4 and 5, voltages Vxa, Vxb, and Vxc actually applied to the display layers 8A, 8B, and 8C are as shown below.

$$Vxa=(C/Ca)(V-Vxo) \quad (2)$$

$$Vxb=(C/Cb)(V-Vxo) \quad (3)$$

$$Vxc=(C/Cc)(V-Vxo) \quad (4)$$

where $$C=CaCbCc/(CaCb+CaCc+CbCc) \quad (5)$$

In this way, when a voltage V is applied to the display element of the example of FIG. 1 or FIG. 6, each of the display layers 8A, 8B, and 8C is applied a voltage resulting from the divided electrostatic capacities as described above, so that the orientation of the cholesteric liquid crystals 11A, 11B, and 11C of the display layers 8A, 8B, and 8C changes depending on the voltage.

This is also the same for the display elements of FIGS. 2 to 5, 7, and 8, except that: in the display element of the example of FIG. 2 or 3, the equivalent electrostatic capacity and equivalent resistance value of components other than the display layers 8A, 8B, and 8C between the writing electrodes 4 and 5 are Co and Ro, respectively, and the electrostatic capacity and resistance value of the separating substrates 6A and 6B are not included; in the display element of the example of FIG. 4 or 7, the equivalent electrostatic capacity and equivalent resistance value of components other than the display layers 8A, 8B, and 8C between the writing electrodes 24 and 25 are Co and Ro, respectively, and the electrostatic capacity and resistance value of the substrates 2 and 3, and the light absorption layer 9 or light scattering layer 18 are included; in the display element of the example of FIG. 5 or 8, the equivalent electrostatic capacity and equivalent resistance value of components other than the display layers 8A, 8B, and 8C between the writing electrodes 4 and 5 are Co and Ro, respectively, and the electrostatic capacity and resistance value of the light absorption layer 9, the light scattering layer 18, and the photoconductive layer 15 are included.

Therefore, in the display element I of the present invention, by controlling a distribution ratio of a voltage V applied from the writing apparatus 20 to the display layers 8A, 8B, and 8C, and electo-optical responses of the display layers 8A, 8B, and 8C to voltages Vxa, Vxb, and Vxc actually applied to the display layers 8A, 8B, and 8C, the electo-optical responses of the display layers 8A, 8B, and 8C to the voltage V applied from the writing apparatus 20 can be set to a desired level.

Specifically, the distribution ratio to the display layers 8A, 8B, and 8C can be controlled by the dielectric constants of the cholesteric liquid crystals 11A, 11B, and 11C constituting the display layers 8A, 8B, and 8C. The electo-optical responses of the display layers 8A, 8B, and 8C can be controlled by the dielectric anisotropy, elasticity coefficient, and helical pitch of the cholesteric liquid crystals 11A, 11B, and 11C constituting the display layers 8A, 8B, and 8C, and further if a high polymer is added, the degree of an anchoring effect in the interface of the high polymer and the liquid crystals, influenced by the structure of the high polymer and the phase separation process.

In the display element of the example of FIG. 5 or 8, when the amount of write light 28 is small, a resistance value of the photoconductive layer 15 becomes large and a voltage (V−Vxo) actually applied to the whole of the display layers 8A, 8B, and 8C decreases; and when the amount of write light 28 is large, a resistance value of the photoconductive layer 15 becomes small and a voltage (V−Vxo) actually applied to the whole of the display layers 8A, 8B, and 8C increases. Therefore, by controlling the light amount of write light 28, when a voltage V is applied across the writing electrodes 4 and 5 of the display element 1 from the writing apparatus 20, a voltage (V−Vxo) actually applied to the whole of the display layers 8A, 8B, and 8C can be controlled.

First Example of Electo-optical Response and a Writing Method

Figure 10:
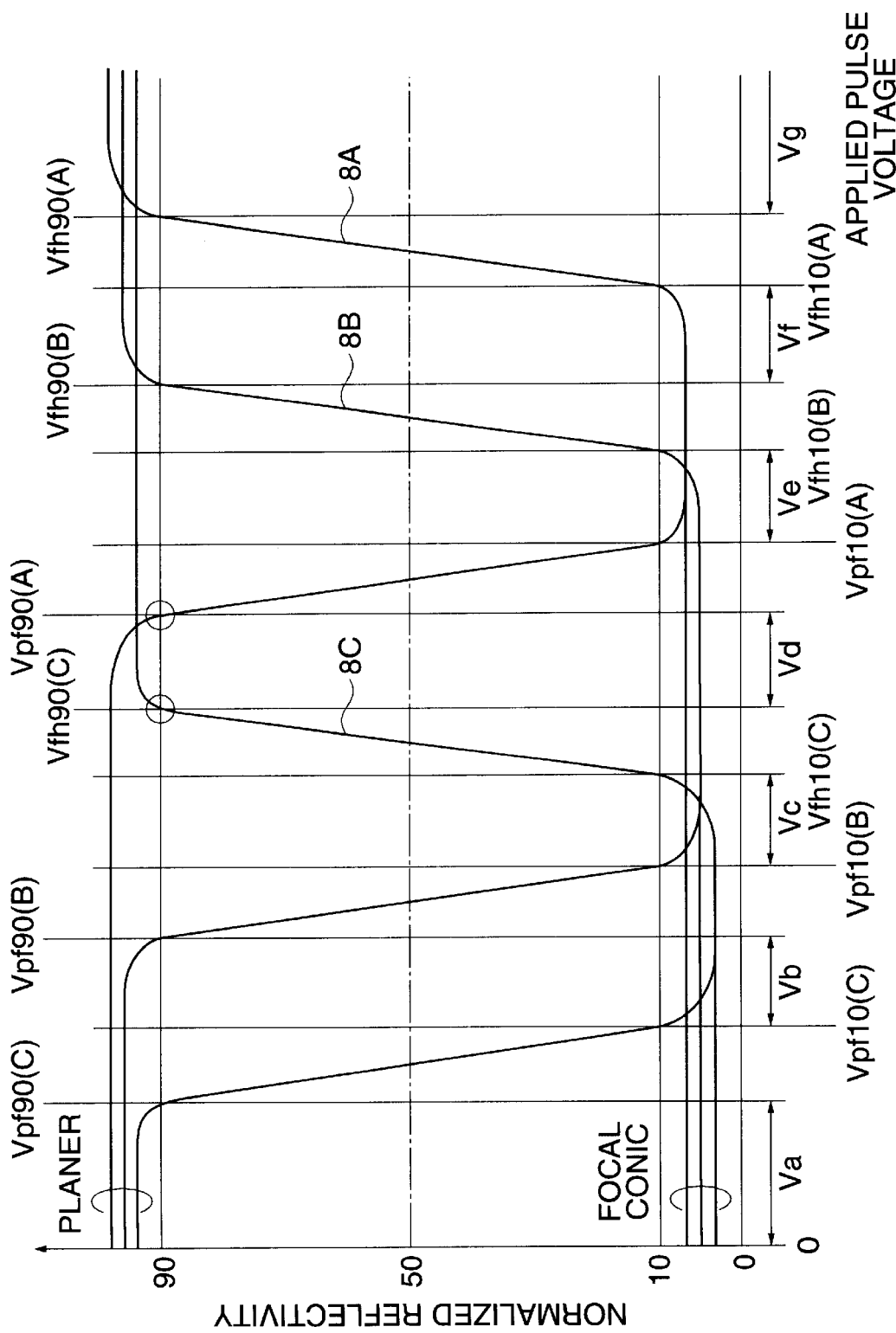
FIG. 10 is a view showing a first example of electro-optical responses of the display element of the present invention.

The electo-optical responses of the display layers 8A, 8B, and 8C of the display element 1 of the present invention to a voltage V applied from the writing apparatus 20 are set as shown in FIG. 10, as a first example.

That is, assuming that threshold voltages shown in FIG. 27 of the display layer 8A are Vpf90(A), Vpf10(A), Vfh10(A), and Vfh90(A); threshold voltages shown in FIG. 27 of the display layer 8B are Vpf90(B), Vpf10(B), Vfh10(B), and Vfh90(B); and threshold voltages shown in FIG. 27 of the display layer 8C are Vpf90(C), Vpf10(C), Vfh10(C), and Vfh90(C), an expression (6) shown below is set.

$$Vpf90(C) < Vpf10(C) < Vpf90(B) < Vpf10(B) < Vfh10(C) < Vfh90(C) < Vpf90(A) < Vpf10(A) < Vfh10(B) < Vfh90(B) < Vfh10(A) < Vfh90(A) \quad (6)$$

The order in which the display layers are stacked is not limited to the examples of FIGS. 1 to 8. That is, regardless of the order in which the display layers are stacked, when the three display layers are defined as 8A, 8B, and 8C in descending order of threshold voltages Vpf90, Vpf10, Vfh10, and Vfh90, arrangements are made so that the following expression is satisfied $$Vfh90(C) < Vpf90(A) \quad (6a)$$

and there are no other threshold voltages between both.

In this case, as shown in FIG. 10, voltages Va, Vb, Vc, Vd, Ve, Vf, and Vg are defined as follows:

Va: Voltage below Vpf90(C)
Vb: Voltage between Vpf10(C) and Vpf90(B)
Vc: Voltage between Vpf10(B) and Vfh10(C)
Vd: Voltage between Vfh90(C) and Vpf90(A)
Ve: Voltage between Vpf10(A) and Vfh10(B)
Vf: Voltage between Vfh90(B) and Vfh10(A)
Vg: Voltage above Vfh90(A)

Figures 11, 12:
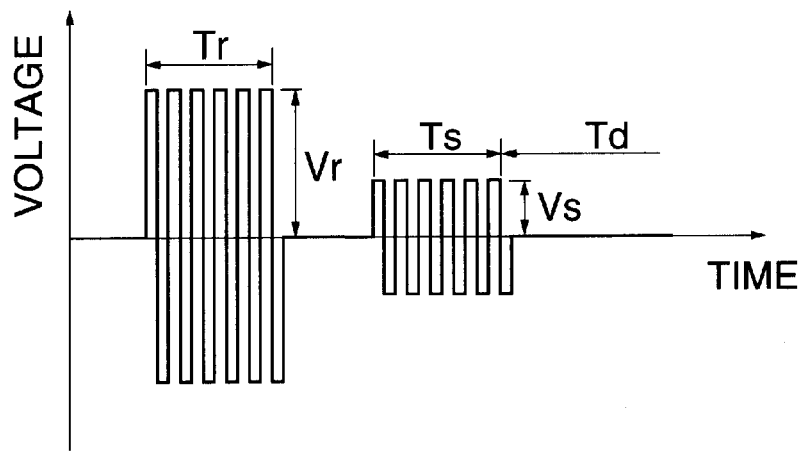
FIG. 11 is a view showing a writing signal to the display element exhibiting the electro-optical responses of FIG. 10.
FIG. 12 is a view showing the orientation states of the display element exhibiting the electro-optical responses of FIG. 10.

When there are a refresh period Tr, a select period Ts, and a following non-voltage display period Td as shown in FIG. 11, by the writing apparatus 20, a writing signal representing a voltage selected from the above-described seven voltage levels Va to Vg, based on input image data, is applied between the writing electrodes 4 and 5 or between the electrodes 24 and 25, holding the relation that a voltage Vr in the refresh period Tr is greater than a voltage Vs in the select period Ts.

FIG. 12 shows, in this case, the orientation states of the display layers 8A, 8B, and 8C by combinations of refresh voltage Vr and select voltage Vs, wherein "p" designates a planar state; "f", a focal conic state; and "?", an undecided state depending on a state before a write signal is applied. The orientation states indicate the display layers 8C, 8B, and 8A from the left in that order.

As is apparent from the above, according to the first example on the display element of the present invention and electo-optical responses and a writing method, the following eight types of orientation states are obtained.

(1) All of the display layers 8A, 8B, and 8C are the planar state.
(2) All of the display layers 8A, 8B, and 8C are the focal conic state.
(3) The display layer 8A is the planar state, and the display layers 8B and 8C are the focal conic state.
(4) The display layer 8B is the planar state, and the display layers 8A and 8C are the focal conic state.
(5) The display layer 8C is the planar state, and the display layers 8A and 8B are the focal conic state.
(6) The display layers 8A and 8B are the planar state, and the display layer 8C is the focal conic state.
(7) The display layers 8A and 8C are the planar state, and the display layer 8B is the focal conic state.
(8) The display layers 8B and 8C are the planar state, and the display layer 8A is the focal conic state.

Therefore, in the display elements of the first embodiment in the examples of FIGS. 1 to 5, for example, on the assumption that the display layers 8A, 8B, and 8C selectively reflect blue light, green light, and red light, respectively, as shown in FIG. 13 ("T" in the drawing indicates that a corresponding display layer is a transmission state due to the focal conic state), the display elements can assume the following eight display states, so that eight colors—white, black, blue, green, red, cyan, magenta, and yellow—can be displayed within one pixel.

FIG. 13A White (W) by additive color mixture of blue, green, and red lights is displayed by a writing signal satisfying relations of Vr=Vg and Vs=Va.

FIG. 13B Black (Bk) is displayed by, e.g., a writing signal satisfying relations of Vr=Ve and Vs=Vc.

FIG. 13C Blue (B) is displayed by a writing signal satisfying relations of Vr=Vg and Vs=Vc.

FIG. 13D Green (G) is displayed by a writing signal satisfying relations of Vr=Vf and Vs=Vb.

FIG. 13E Red (R) is displayed by, e.g., a writing signal satisfying relations of Vr=Ve and Vs=Va.

FIG. 13F Cyan (C) by additive color mixture of blue and green lights is displayed by a writing signal satisfying relations of Vr=Vg and Vs=Vb.

FIG. 13G Magenta (M) by additive color mixture of blue and red lights is displayed by a writing signal satisfying relations of Vr=Vg and Vs=Vd.

FIG. 13H Yellow (Y) by additive color mixture of green and red lights is displayed by, e.g., a writing signal satisfying relations of Vr=Vf and Vs=Va.

Moreover, a full-color display can be made by performing area gradation such as the dither method and the error diffusion method.

The relationship between the magnitudes of threshold voltages of the display layers 8A, 8B, and 8C and selective reflection colors can be arbitrarily set without being limited to the above examples.

On the other hand, in the display elements of the second embodiment in the examples of FIGS. 6 to 8, as the dichroic dyes 17A, 17B, and 17C, by using positive dichroic dyes that a light absorption index in a molecular long axis direction is larger than that in a molecular short axis direction, in the planar state, a display layer absorbs incident light, and in the focal conic state, the display layer allows almost all of incident light to transmit therethrough.

Therefore, in the display elements of the second embodiment, for example, if the display layer 8A is added with a cyan dichroic dye selectively absorbing red light as a dichroic dye 17A, the display layer 8B is added with a magenta dichroic dye selectively absorbing green light as a dichroic dye 17B, and the display layer 8C is added with a yellow dichroic dye selectively absorbing blue light as a dichroic dye 17C, as shown in FIG. 14 ("T" in the drawing indicates that a corresponding display layer is a transmission state due to the focal conic state), the display elements can assume the following eight display states, so that eight colors—white, black, blue, green, red, cyan, magenta, and yellow—can be displayed within one pixel.

FIG. 14A Black (Bk) by subtractive color mixture of cyan, magenta, and yellow lights is displayed by a writing signal satisfying relations of Vr=Vg and Vs=Va.

FIG. 14B White (W) is displayed by, e.g., a writing signal satisfying relations of Vr=Ve and Vs=Vc.

FIG. 14C Cyan (C) is displayed by a writing signal satisfying relations of Vr=Vg and Vs=Vc.

FIG. 14D Magenta (M) is displayed by a writing signal satisfying relations of Vr=Vf and Vs=Vb.

FIG. 14E Yellow (Y) is displayed by, e.g., a writing signal satisfying relations of Vr=Ve and Vs=Va.

FIG. 14F Blue (B) by subtractive color mixture of cyan and magenta lights is displayed by a writing signal satisfying relations of Vr=Vg and Vs=Vb.

FIG. 14G Green (G) by subtractive color mixture of cyan and yellow lights is displayed by a writing signal satisfying relations of Vr=Vg and Vs=Vd.

FIG. 14H Red (R) by additive color mixture of green and red lights is displayed by, e.g., a writing signal satisfying relations of Vr=Vf and Vs=Va.

Moreover, a full-color display can be made by performing area gradation such as the dither method and the error diffusion method.

The relationship between the magnitudes of threshold voltages of the display layers 8A, 8B, and 8C and selective absorption colors can be arbitrarily set without being limited to the above examples.

Second Example of Electo-optical Response and a Writing Method

Figure 15:
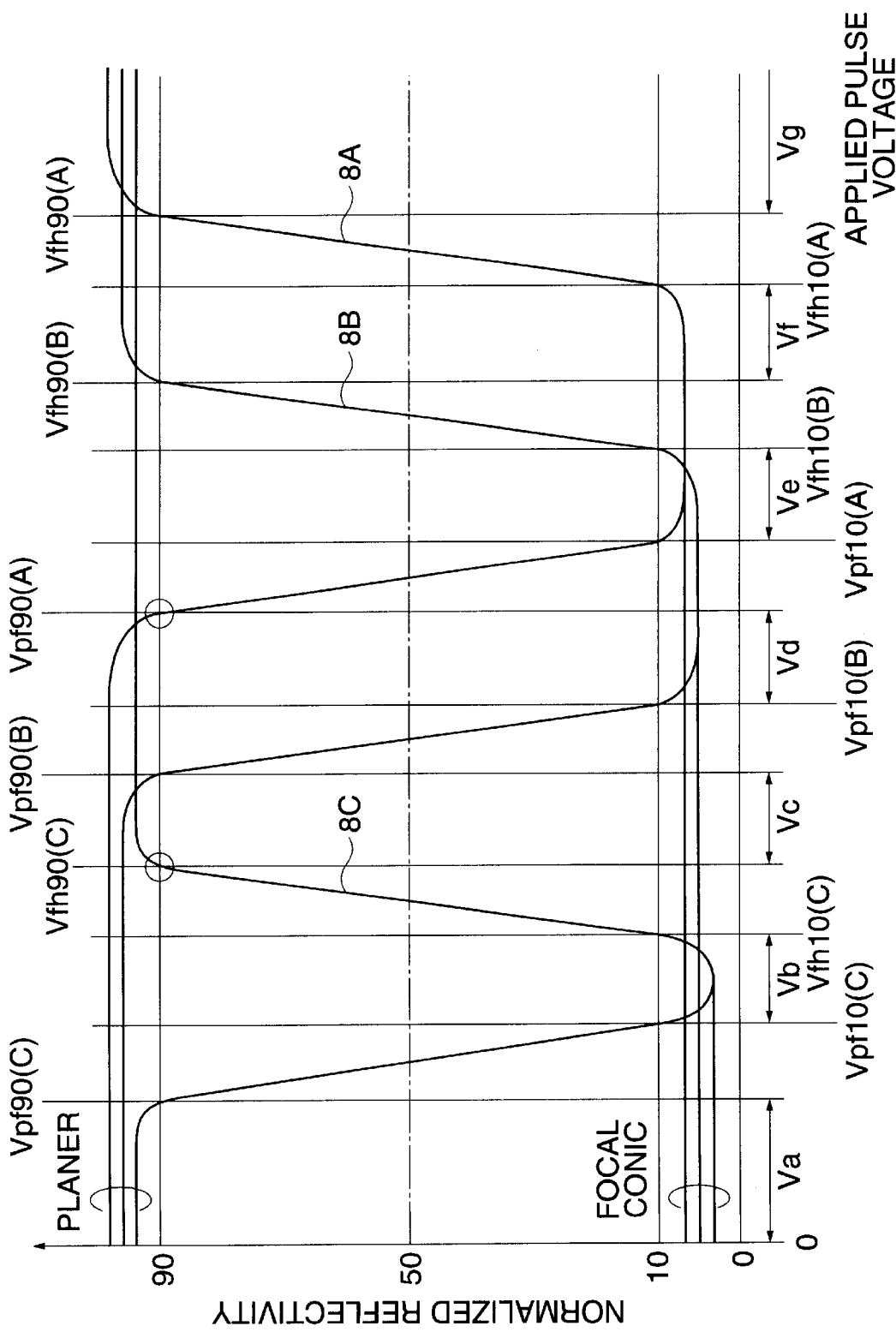
FIG. 15 is a view showing a second example of electro-optical responses of the display element of the present invention.

The electo-optical responses of the display layers 8A, 8B, and 8C of the display element 1 of the present invention to a voltage V applied from the writing apparatus 20 are set by an expression (7) below as shown in FIG. 15, as a second example.

$$Vpf90(C) < Vpf10(C) < Vfh10(C) < Vfh90(C) < Vpf90(B)$$
$$< Vpf10(B) < Vpf90(A) < Vpf10(A) < Vfh10(B) < Vfh90(B) < Vfh10(A) < Vfh90(A) \quad (7)$$

That is, regardless of the order in which the display layers are stacked, when the three display layers are defined as 8A, 8B, and 8C in descending order of threshold voltages Vpf90, Vpf10, Vfh10, and Vfh90, arrangements are made so that the following expression is satisfied.

$$Vfh90(C) < Vpf90(B) < Vpf10(B) < Vpf90(A) \quad (7a)$$

That is, in the relation of the expression (6a), Vpf90(B) and Vpf10(B) are put between Vfh90(C) and Vpf90(A).

In this case, as shown in FIG. 15, voltages Va, Vb, Vc, Vd, Ve, Vf, and Vg are defined as follows:

Va: Voltage below Vpf90(C)
Vb: Voltage between Vpf10(C) and Vfh10(C)
Vc: Voltage between Vfh90(C) and Vpf90(B)
Vd: Voltage between Vpf10(B) and Vpf90(A)
Ve: Voltage between Vpf10(A) and Vfh10(B)
Vf: Voltage between Vfh90(B) and Vfh10(A)
Vg: Voltage above Vfh90(A)

Figures 16, 17:
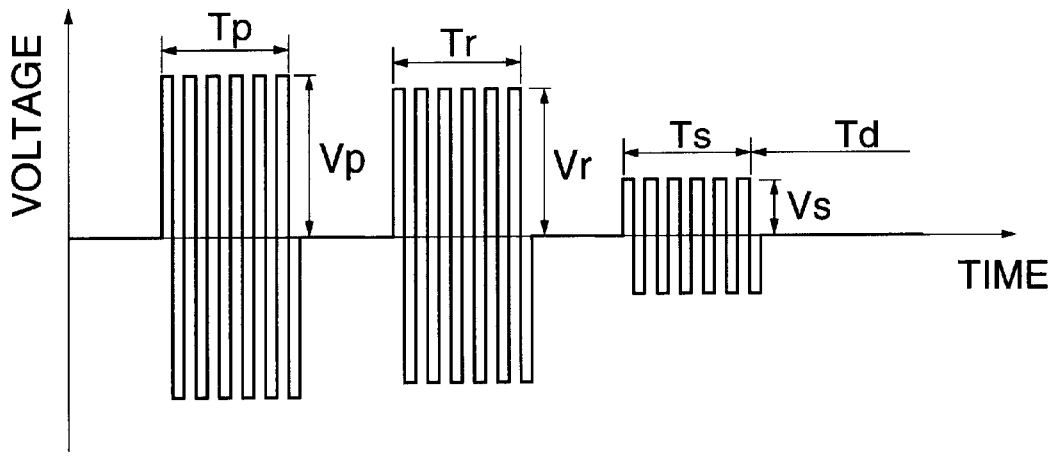
FIG. 16 is a view showing a writing signal to the display element exhibiting the electro-optical responses of FIG. 15.
FIG. 17 is a view showing the orientation states of the display element exhibiting the electro-optical responses of FIG. 15.

When there are a preset period Tp, a refresh period Tr, a select period Ts, and a following non-voltage display period Td as shown in FIG. 16, wherein a voltage Vp in the preset period is equal to the above Vg, by the writing apparatus 20, a writing signal representing a voltage selected from the above-described seven voltage levels Va to Vg, based on input image data, is applied between the writing electrodes 4 and 5 or between the electrodes 24 and 25, holding the relation that a voltage Vr in the refresh period Tr is greater than a voltage Vs in the select period Ts.

FIG. 17 shows, in this case, the orientation states of the display layers 8A, 8B, and 8C by combinations of refresh voltage Vr and select voltage Vs, wherein "p" designates a planar state and "f" designates a focal conic state. The orientation states indicate the display layers 8C, 8B, and 8A from the left in that order.

As is apparent from the above, according to the second example on the display element of the present invention and electo-optical responses and a writing method, eight types of orientation states are obtained, like the first example.

Therefore, in the display elements of the first embodiment in the examples of FIGS. 1 to 5, for example, on the assumption that the display layers 8A, 8B, and 8C selectively reflect blue light, green light, and red light, respectively, as shown in FIG. 13, the display elements can assume the following eight display states, so that eight colors—white, black, blue, green, red, cyan, magenta, and yellow—can be displayed within one pixel.

FIG. 13A White (W) by additive color mixture of blue, green, and red lights is displayed by, e.g., a writing signal satisfying relations of Vp=Vg, Vr=Vg, and Vs=Va.

FIG. 13B Black (Bk) is displayed by a writing signal satisfying relations of Vp=Vg, Vr=Ve, and Vs=Vb.

FIG. 13C Blue (B) is displayed by a writing signal satisfying relations of Vp=Vg, Vr=Vd, and Vs=Vb.

FIG. 13D Green (G) is displayed by a writing signal satisfying relations of Vp=Vg, Vr=Vf, and Vs=Vb.

FIG. 13E Red (R) is displayed by, e.g., a writing signal satisfying relations of Vp=Vg, Vr=Ve, and Vs=Va.

FIG. 13F Cyan (C) by additive color mixture of blue and green lights is displayed by a writing signal satisfying relations of Vp=Vg, Vr=Vg, and Vs=Vb.

FIG. 13G Magenta (M) by additive color mixture of blue and red lights is displayed by, e.g., a writing signal satisfying relations of Vp=Vg, Vr=Vg, and Vs=Vd.

FIG. 13H Yellow (Y) by additive color mixture of green and red lights is displayed by, e.g., a writing signal satisfying relations of Vp=Vg, Vr=Vf, and Vs=Va.

In the display elements of the second embodiment in the examples of FIGS. 6 to 8, for example, if the display layer 8A is added with a cyan dichroic dye selectively absorbing red light as a dichroic dye 17A, the display layer 8B is added with a magenta dichroic dye selectively absorbing green light as a dichroic dye 17B, and the display layer 8C is added with a yellow dichroic dye selectively absorbing blue light as a dichroic dye 17C, as shown in FIG. 14, the display elements can assume the following eight display states, so that eight colors—white, black, blue, green, red, cyan, magenta, and yellow—can be displayed within one pixel.

FIG. 14A Black (Bk) by subtractive color mixture of cyan, magenta, and yellow lights is displayed by a writing signal satisfying relations of Vp=Vg, Vr=Vg, and Vs=Va.

FIG. 14B White (W) is displayed by, e.g., a writing signal satisfying relations of Vp=Vg, Vr=Ve, and Vs=Vb.

FIG. 14C Cyan (C) is displayed by a writing signal satisfying relations of Vp=Vg, Vr=Vd, and Vs=Vb.

FIG. 14D Magenta (M) is displayed by a writing signal satisfying relations of Vp=Vg, Vr=Vf, and Vs=Vb.

FIG. 14E Yellow (Y) is displayed by, e.g., a writing signal satisfying relations of Vp=Vg, Vr=Ve, and Vs=Va.

FIG. 14F Blue (B) by subtractive color mixture of cyan and magenta lights is displayed by, e.g., a writing signal satisfying relations of Vp=Vg, Vr=Vg, and Vs=Vb.

FIG. 14G Green (G) by subtractive color mixture of cyan and yellow lights is displayed by, e.g., a writing signal satisfying relations of Vp=Vg, Vr=Vg, and Vs=Vd.

FIG. 14H Red (R) by additive color mixture of magenta and yellow lights is displayed by, e.g., a writing signal satisfying relations of Vp=Vg, Vr=Vf, and Vs=Va.

The present example is the same as the first example, in that a full-color display can be made by performing area gradation such as the dither method and the error diffusion method, and the relationship between the magnitudes of threshold voltages of the display layers 8A, 8B, and 8C and the selective reflection colors of the first embodiment or the selective absorption colors of the second embodiment can be arbitrarily set without being limited to the above examples.

Third Example of Electo-optical Response and a Writing Method

Figure 18:
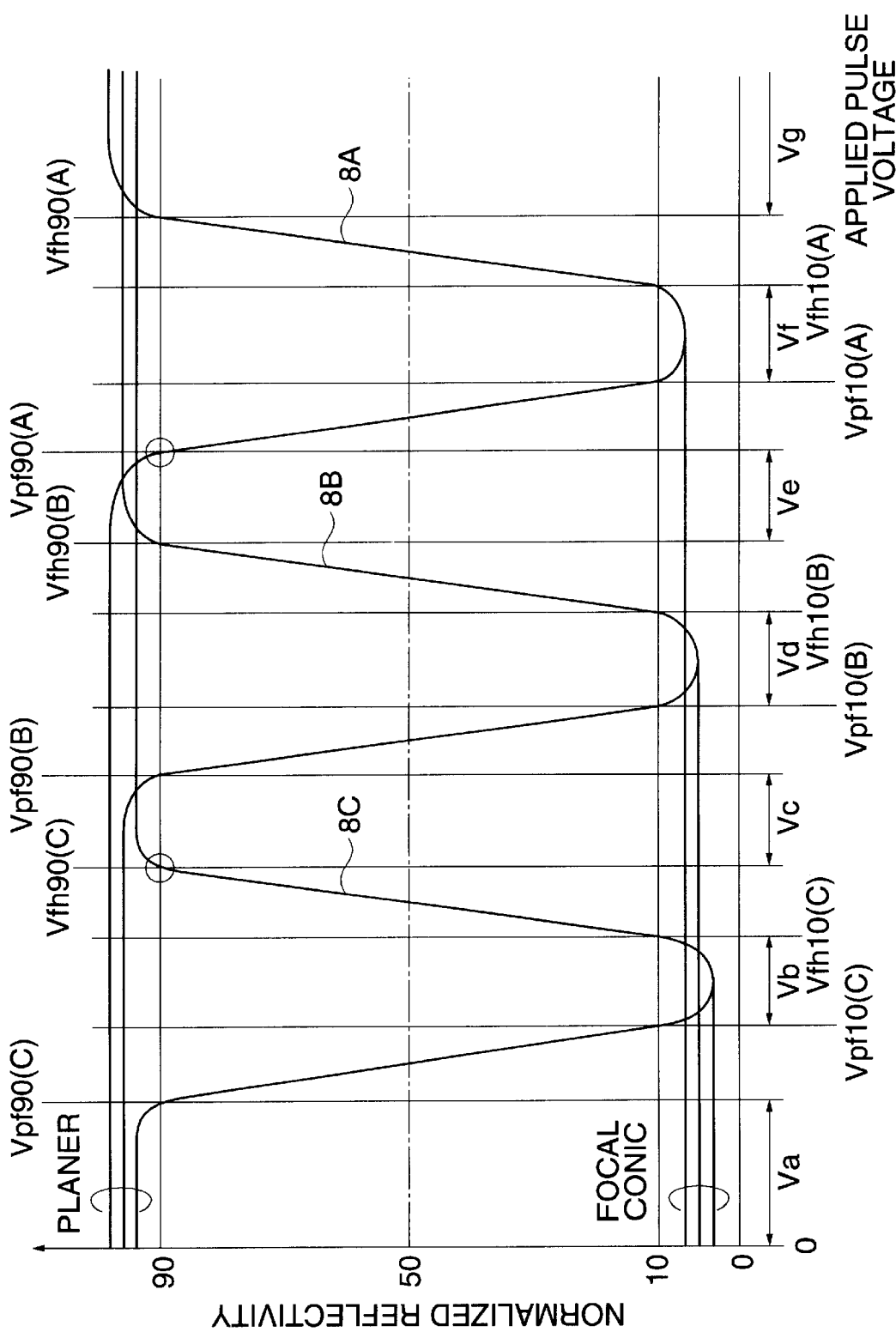
FIG. 18 is a view showing a third example of electro-optical responses of the display element of the present invention.

The electo-optical responses of the display layers 8A, 8B, and 8C of the display element 1 of the present invention to a voltage V applied from the writing apparatus 20 are set by an expression (8) below as shown in FIG. 18, as a third example.

$$Vpf90(C)<Vpf10(C)<Vfh10(C)<Vfh90(C)<Vpf90(B)<Vpf10(B)<Vfh10(B)<Vfh90(B)<Vpf90(A)<Vpf10(A)<Vfh10(A)<Vfh90(A) \quad (8)$$

That is, regardless of the order in which the display layers are stacked, when the three display layers are defined as 8A, 8B, and 8C in descending order of threshold voltages Vpf90, Vpf10, Vfh10, and Vfh90, arrangements are made so that the following expression is satisfied.

$$Vfh90(C)<Vpf90(B)<Vpf10(B)<Vfh10(B)<Vfh90(B)<Vpf90(A) \quad (8a)$$

That is, in the relation of the expression (6a), Vpf90(B), Vpf10(B), Vfh10(B), and Vfh90(B) are put between Vfh90(C) and Vpf90(A).

In this case, as shown in FIG. 18, voltages Va, Vb, Vc, Vd, Ve, Vf, and Vg are defined as follows:

Va: Voltage below Vpf90(C)
Vb: Voltage between Vpf10(C) and Vfh10(C)
Vc: Voltage between Vfh90(C) and Vpf90(B)
Vd: Voltage between Vpf10(B) and Vfh10(B)
Ve: Voltage between Vfh90(B) and Vpf90(A)
Vf: Voltage between Vpf10(A) and Vfh10(A)
Vg: Voltage above Vfh90(A)

When there are a first preset period Tp1, a second preset period Tp2, a refresh period Tr, a select period Ts, and a following non-voltage display period Td as shown in FIG. 19, wherein a voltage Vp1 in the first preset period Tp1 is equal to the above Vg and a voltage Vp2 in the second preset period Tp2 is equal to the above Vf or Ve, by the writing apparatus 20, a writing signal representing a voltage selected from the above-described seven voltage levels Va to Vg, based on input image data, is applied between the writing electrodes 4 and 5 or between the electrodes 24 and 25, holding the relation that a voltage Vr in the refresh period Tr is greater than a voltage Vs in the select period Ts.

FIG. 20 and FIG. 21 show the orientation states of the display layers 8A, 8B, and 8C by combinations of refresh voltage Vr and select voltage Vs, in which FIG. 20 assumes Vp2=Vf, and FIG. 21 assumes Vpf2=Ve. "p" designates a planar state and "f" designates a focal conic state. The orientation states indicate the display layers 8C, 8B, and 8A from the left in that order.

As is apparent from the above, according to the third example on the display element of the present invention and electo-optical responses and a writing method, eight types of orientation states are obtained, like the first and second examples.

Therefore, in the display elements of the first embodiment in the examples of FIGS. 1 to 5, for example, on the assumption that the display layers 8A, 8B, and 8C selectively reflect blue light, green light, and red light, respectively, as shown in FIG. 13, the display elements can assume the following eight display states, so that eight colors—white, black, blue, green, red, cyan, magenta, and yellow—can be displayed within one pixel.

FIG. 13A White (W) by additive color mixture of blue, green, and red lights is displayed by, e.g., a writing signal satisfying relations of Vp1=Vg, Vp2=Vf, Vr=Vg, and Vs=Va.

FIG. 13B Black (Bk) is displayed by a writing signal satisfying relations of Vp1=Vg, Vp2=Vf, Vr=Vd, and Vs=Vb.

FIG. 13C Blue (B) is displayed by a writing signal satisfying relations of Vp1=Vg, Vp2=Ve, Vr=Vd, and Vs=Vb.

FIG. 13D Green (G) is displayed by, e.g., a writing signal satisfying relations of Vp1=Vg, Vp2=Vf, Vr=Vf, and Vs=Vb.

FIG. 13E Red (R) is displayed by, e.g., a writing signal satisfying relations of Vp1=Vg, Vp2=Vf, Vr=Vd, and Vs=Va.

FIG. 13F Cyan (C) by additive color mixture of blue and green lights is displayed by, e.g., a writing signal satisfying relations of Vp1=Vg, Vp2=Vf, Vr=Vg, and Vs=Vb.

FIG. 13G Magenta (M) by additive color mixture of blue and red lights is displayed by, e.g., a writing signal satisfying relations of Vp1=Vg, Vp2=Vf, Vr=Vg, and Vs=Vd.

FIG. 13H Yellow (Y) by additive color mixture of green and red lights is displayed by, e.g., a writing signal satisfying relations of Vp1=Vg, Vp2=Vf, Vr=Vf, and Vs=Va.

In the display elements of the second embodiment in the examples of FIGS. 6 to 8, for example, if the display layer 8A is added with a cyan dichroic dye selectively absorbing red light as a dichroic dye 17A, the display layer 8B is added with a magenta dichroic dye selectively absorbing green light as a dichroic dye 17B, and the display layer 8C is added with a yellow dichroic dye selectively absorbing blue light as a dichroic dye 17C, as shown in FIG. 14, the display elements can assume the following eight display states, so that eight colors—white, black, blue, green, red, cyan, magenta, and yellow—can be displayed within one pixel.

FIG. 14A Black (Bk) by subtractive color mixture of cyan, magenta, and yellow lights is displayed by a writing signal satisfying relations of Vp1=Vg, Vp2=Vf, Vr=Vg, and Vs=Va.

FIG. 13B White (W) is displayed by, e.g., a writing signal satisfying relations of Vp1=Vg, Vp2=Vf, Vr=Vd, and Vs=Vb.

FIG. 13C Cyan (C) is displayed by a writing signal satisfying relations of Vp1=Vg, Vp2=Ve, Vr=Vd, and Vs=Vb.

FIG. 13D Magenta (M) is displayed by, e.g., a writing signal satisfying relations of Vp1=Vg, Vp2=Vf, Vr=Vf, and Vs=Vb.

FIG. 13E Yellow (Y) is displayed by, e.g., a writing signal satisfying relations of Vp1=Vg, Vp2=Vf, Vr=Vd, and Vs=Va.

FIG. 13F Blue (B) by subtractive color mixture of cyan and magenta lights is displayed by, e.g., a writing signal satisfying relations of Vp1=Vg, Vp2=Vf, Vr=Vg, and Vs=Vb.

FIG. 13G Green (G) by subtractive color mixture of cyan and yellow lights is displayed by, e.g., a writing signal satisfying relations of Vp1=Vg, Vp2=Vf, Vr=Vg, and Vs=Vd.

FIG. 13H Red (R) by additive color mixture of magenta and yellow lights is displayed by, e.g., a writing signal satisfying relations of Vp1=Vg, Vp2=Vf, Vr=Vf, and Vs=Va.

The present example is the same as the first and second examples, in that a full-color display can be made by performing area gradation such as the dither method and the error diffusion method, and the relationship between the magnitudes of threshold voltages of the display layers 8A, 8B, and 8C and the selective reflection colors of the first embodiment or the selective absorption colors of the second embodiment can be arbitrarily set without being limited to the above examples.

Other Embodiment or Example

In the examples of FIGS. 1 to 8, only three display layers 8A, 8B, and 8C are stacked between the substrates 2 and 3. However, four display layers or more may be stacked.

For example, as in the first embodiment, when a display is made by selective reflection of cholesteric liquid crystals, each of display layers selectively reflecting blue, green, and red lights, respectively may be constituted by a display layer including a cholesteric liquid crystal having a clockwise helical torsion direction and a display layer including a cholesteric liquid crystal having a counterclockwise helical torsion direction. In this case, although a total of six display layers are stacked between a pair of substrates, two display layers selectively reflecting the same color light are adapted to exhibit the same electo-optical response. Thereby, a display having a higher reflectivity can be made.

In addition to display layers selectively reflecting blue, green, and red light, respectively, provided between a pair of substrates, a display layer selectively reflecting yellow light may also be stacked.

As in the second embodiment in the examples of FIGS. 6 to 8, when a display is made by selective absorption, instead of adding dichroic dyes 17A, 17b, and 17C to the cholesteric liquid crystals 11A, 11B, and 11C as described above, as the cholesteric liquid crystals 11A, 11B, and 11C, those having dichroism that selectively absorb mutually different color lights can be used.

In the above-described examples on the electo-optical responses of cholesteric liquid crystals constituting display layers, the state in which a normalized reflectivity is 90 or more is defined as a selective reflection state, and the state in which a normalized reflectivity is 10 or more is defined as a transmission state. However, in principle, the state in which a normalized reflectivity is equal to or greater than a value exceeding 50 may be defined as a selective reflection state, and the state in which a normalized reflectivity is less than 50 may be defined as a transmission state. However, definitions to narrow the selective reflection state and the transmission state are more desirable in terms of display characteristics.

EXPERIMENT EXAMPLES

EXPERIMENT EXAMPLE 1

Since it is impossible to evaluate the characteristics of each of stacked display layers, in an experiment example 1, a display cell having a blue display layer, a display cell having a green display layer, and a display cell having a red display layer were fabricated, and writing was performed in the state in which the display cells were connected in series, to measure display characteristics, the state being electrically equivalent to the case where the display layers were stacked.

As a cholesteric liquid crystal to constitute the blue display layer, a nematic liquid crystal (MLC2037 made by Merck Ltd.), a chiral agent 1 (CB15 made by Merck Ltd.), and a chiral agent 2 (R1011 made by Merck Ltd.) were mixed at the ratio of 73.0 wt %, 22.5 wt %, and 4.5 wt %, respectively.

As a cholesteric liquid crystal to constitute the green display layer, a nematic liquid crystal (MLC2038 made by Merck Ltd.), the chiral agent 1 (CB15 made by Merck Ltd.), and the chiral agent 2 (R1011 made by Merck Ltd.) were mixed at the ratio of 78.0 wt %, 18.3 wt %, and 3.7 wt %, respectively.

As a cholesteric liquid crystal to constitute the red display layer, a nematic liquid crystal (ZLI3806 made by Merck Ltd.), the chiral agent 1 (CB15 made by Merck Ltd.), and the chiral agent 2 (R1011 made by Merck Ltd.) were mixed at the ratio of 78.4 wt %, 18.0 wt %, and 3.6 wt %, respectively.

A material with a 15.0 wt % polymer precursor (NOA65 made by Norland, Inc.) added to a blue cholesteric liquid crystal was injected into an empty cell (made by EHC) by capillarity wherein the empty cell opposes at a gap of 5 μm a pair of glass substrates each having an ITO transparent electrode 1.1 mm thick. UV light of 50 mW/cm$^2$ (365 nm) was applied for 30 seconds so that a light absorption layer of black resin was formed on the back of one glass substrate to obtain a blue display cell.

In the same manner, a green display cell and a red display cell were created.

The obtained blue, green, and red display cells were connected in series, and using a writing apparatus including an arbitrary waveform generator (made by Biomation, Inc.) and a high-voltage power supply (made by TREK INC.), a 1-kHz refresh signal was applied for 200 ms and a 1-kHz select signal was applied for 200 ms. The display state of each display cell was measured using an integrating sphere type spectrophotometer (made by Minolta Co., Ltd.).

Figures 22, 23:
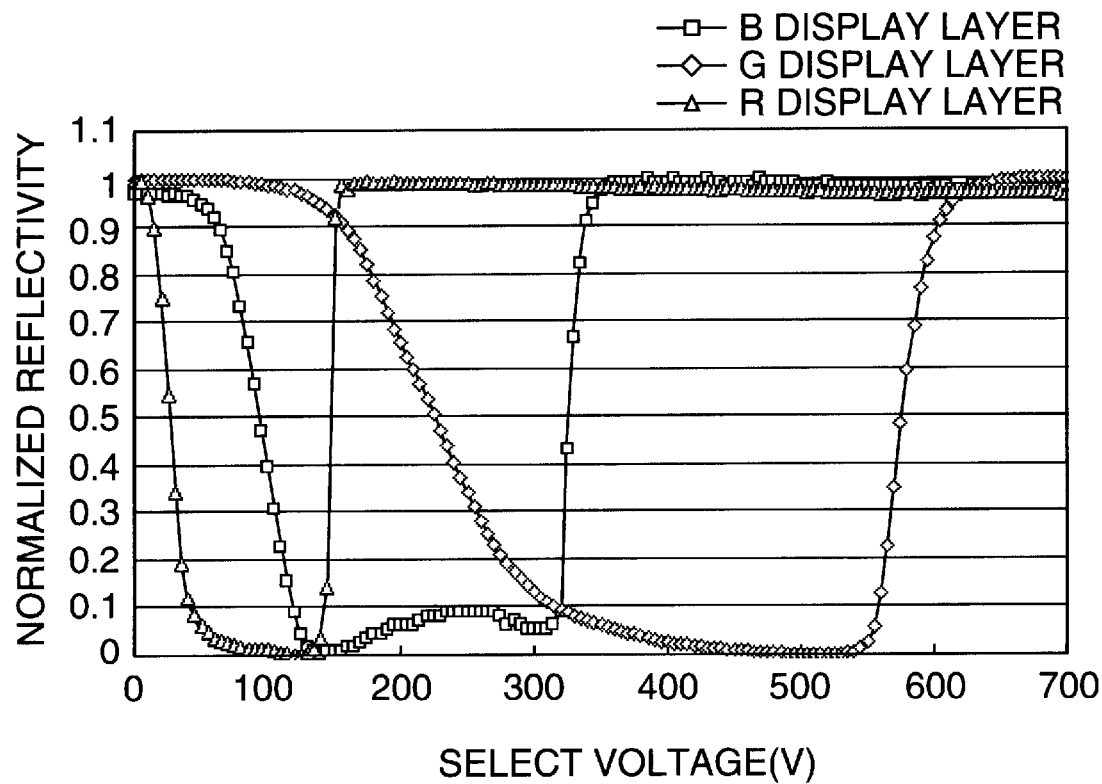
FIG. 22 is a view showing reflection reflectivity to a select voltage of the display element of the experiment example 1.
FIG. 23 is a view showing an example of a writing signal when the display element of the experiment example 1 is displayed in eight colors.

FIG. 22 shows a change in normalized reflectivity of each display layer when any select voltage is applied after a 700-V refresh voltage is applied.

It was confirmed that a writing method of the present invention could be achieved by controlling a writing signal so that, e.g., writing voltages shown in FIG. 23 were applied to the whole of the display layers, based on the measurement results of FIG. 22.

EXPERIMENT EXAMPLE 2

In an experiment example 2, a three-layer display element was fabricated using the same cholesteric liquid crystals as in the experiment example 1 to measure display characteristics.

A spherical spacer (Micropearl SP-205 made by Sekisui Fine Chemical, Inc.) 5 µm in diameter was wet-dispersed on a glass substrate 1.1 mm thick (7059 made by Corning) provided with an ITO transparent electrode, a material with a 15.0 wt % polymer precursor (NOA65 made by Norland, Inc.) added to a blue cholesteric liquid crystal was dropped, a spherical spacer (Micropearl SP-205 made by Sekisui Fine Chemical, Inc.) 5 µm in diameter was wet-dispersed on a single side, and a PET film 4.5 µm thick (LUMIRROR made by Toray Industries, Inc.) supported by a plastic frame was tightly bonded so that it contacts with a non-dispersion surface of the spacer.

Moreover, on top of the PET film, a material with a 15.0 wt % polymer precursor (NOA65 made by Norland, Inc.) added to a blue cholesteric liquid crystal was dropped, a spherical spacer (Micropearl SP-205 made by Sekisui Fine Chemical, Inc.) 5 µm in diameter was wet-dispersed on a single side, and a PET film 4.5 µm thick (LUMIRROR made by Toray Industries, Inc.) supported by a plastic frame was tightly bonded so that it contacts with a non-dispersion side of the spacer.

Moreover, on top of the PET film, a material with a 15.0 wt % polymer precursor (NOA65 made by Norland, Inc.) added to a red cholesteric liquid crystal was dropped, and a glass substrate 1.1 mm thick (7059 made by Corning) provided with an ITO transparent electrode was tightly bonded so that the electrode side would contact the liquid crystal.

UV light of 50 mW/cm$^2$ was applied for 30 seconds, and a light absorption layer of black resin was formed on the back of a glass substrate of the red display layer, so that a display element in which display layers of three colors were stacked was obtained.

Using a writing apparatus including an arbitrary waveform generator (made by Biomation, Inc.) and a high-voltage power supply (made by TREK, INC.), the obtained display element was applied with a 1-kHz refresh signal for 200 ms and with a 1-kHz select signal for 200 ms. The display state of the display element was measured using an integrating sphere type spectrophotometer (made by Minolta Co., Ltd.).

Figure 24:
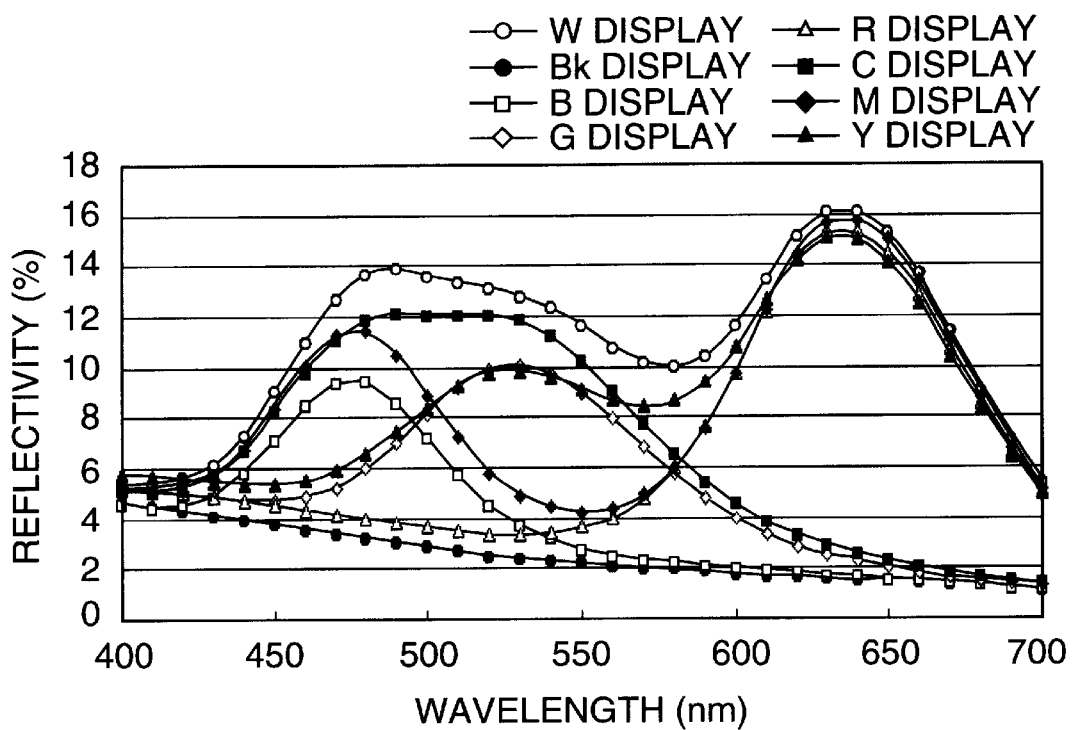
FIG. 24 is a view showing a reflection spectrum of the display element of the experiment example 2.
Figure 25:
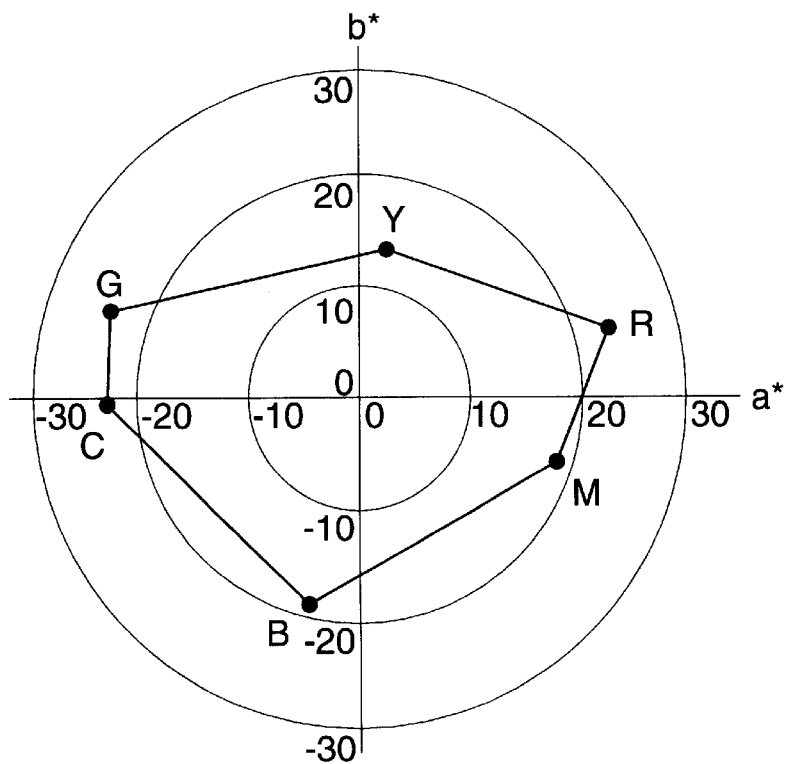
FIG. 25 is a view showing a color reproduction area of the display element of the experiment example 2.
Figure 28:
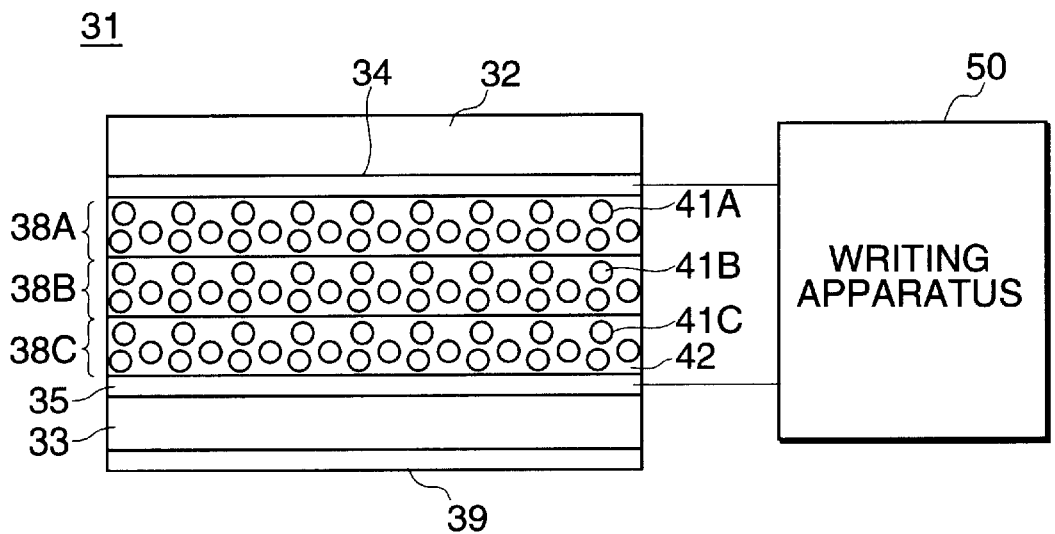
FIG. 28 is a view showing a first conventional display element and a writing apparatus.
Figure 29:
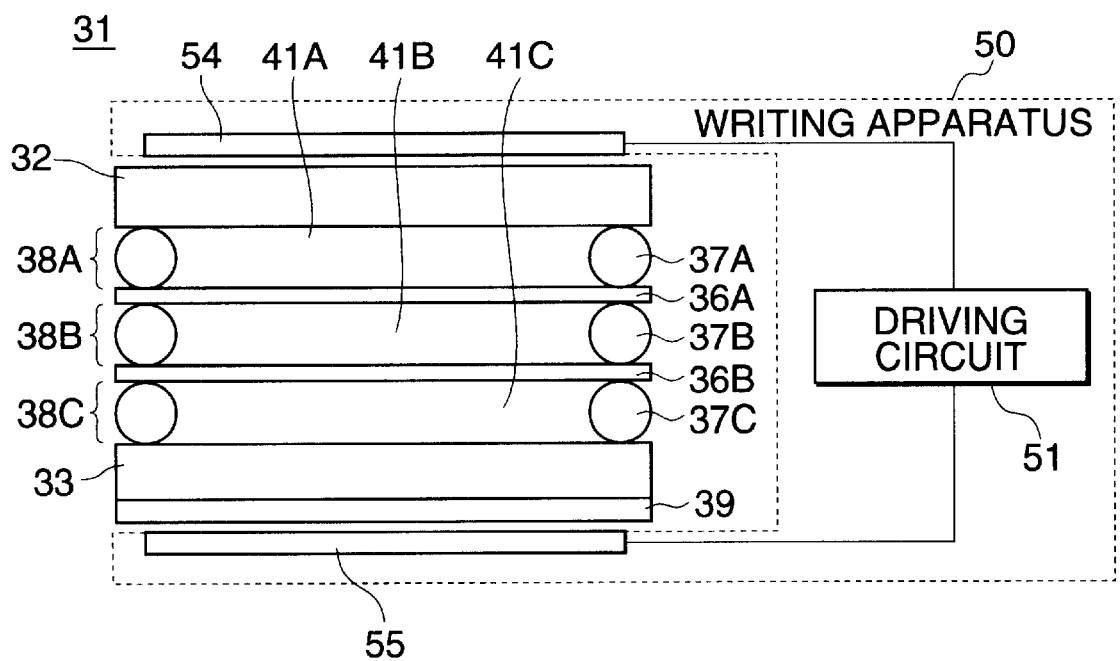
FIG. 29 is a view showing a second conventional display element and a writing apparatus.
Figure 30:
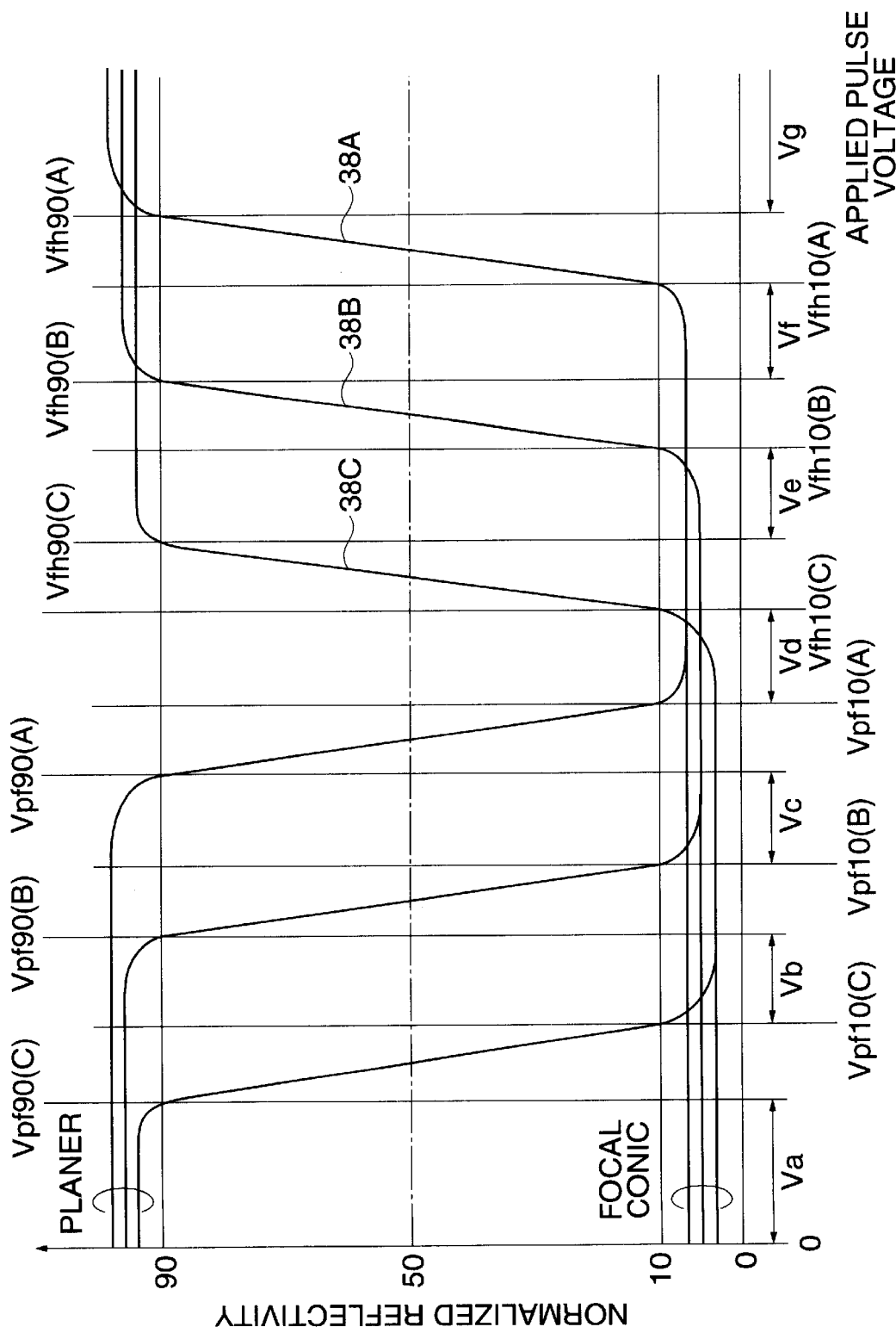
FIG. 30 is a view showing electo-optical responses of a conventional display element.
Figures 31, 32:
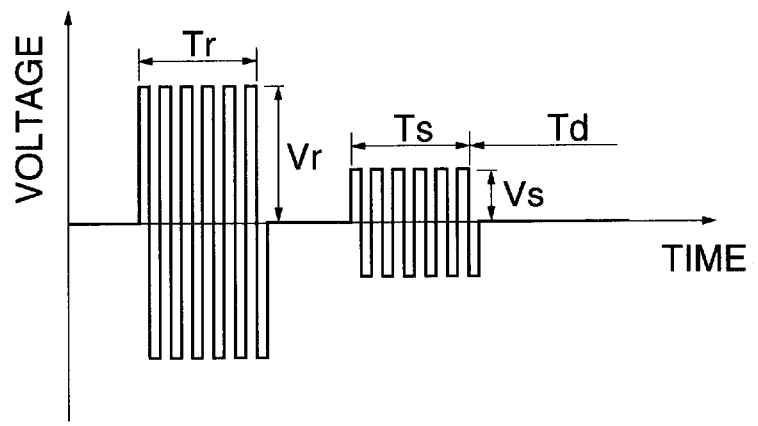
FIG. 31 is a view showing a writing signal to a conventional display element.
FIG. 32 is a view showing orientation states and display states of a conventional display element.

FIG. 24 shows reflection spectrum distributions in the case where a writing signal is controlled so that the writing voltages shown in FIG. 23 are applied to the whole of the display layers in consideration of voltage drop by a separating substrate; and FIG. 25 shows color reproducing areas in the a*b* display color system in that case. It was confirmed that the display element of the experiment example 2 could display eight colors—white, black, blue, green, red, cyan, magenta, and yellow—within one pixel.

EXPERIMENT EXAMPLE 3

In an experiment example 3, a display element of PDLC structure was fabricated using the same cholesteric liquid crystals as in the first experiment example 1.

A 10 wt % aqueous solution of PVA 1000 (made by Wako Pure Chemical Industries Ltd.) was mixed with cholesteric liquid crystals respectively at the ratio of 1 to 2.5, and the mixtures were stirred at 15,000 rpm for three minutes using a homogenizer (made by OMNI) to produce blue, green, and red emulsions.

A coating of the viscosity-adjusted blue emulsion was applied on a PET film 125 µm thick provided with an ITO transparent electrode(Hybeam made by Toray Industries, Inc.), using a doctor blade (Gardner, Inc.) and was dried to form a blue display layer about 10 µm thick of PDLC structure.

To stack display layers of three colors on top of each other, green and red display layers were successively formed on the blue display layer by the same method, and a PET film 125 µm thick provided with an ITO transparent electrode(Hybeam made by Toray Industries, Inc.) was tightly bonded onto the red display layer, using a laminator.

A light absorption layer of black resin was formed on the back of the PET film of a non-display side, and a display element in which three-color display layers of PDLC structure were stacked was obtained.

EXPERIMENT EXAMPLE 4

In an experiment example 4, a display element of micro capsule structure was fabricated using the same cholesteric liquid crystals as in the experiment example 1.

Each cholesteric liquid crystal was dispersed in a 0.25 wt % aqueous sodium dodecyl benzene sulfate, using an SPG membrane emulsification apparatus having a pore diameter of 3.3 µm (made by Ise Chemicals Corp.), and blue, green, and red emulsions were produced.

The obtained emulsions were mixed with a melamine-formaldehyde prepolymer (MX-035 made by SANWA CHEMICAL CO., LTD.) at the ratio of 2 to 1 with respect to cholesteric liquid crystals, respectively, and a 10 wt % aqueous solution of acetic acid was dropped to adjust pH to 4.5.

The obtained mixtures were stirred at 70° C. for 60 minutes and a melamine-formaldehyde prepolymer was polymerized in situ to obtain blue, green, and red micro capsules about 10 µm in diameter.

The blue micro capsule was dispersed in a binder of a PVA aqueous solution, a coating was produced on a PET film 125 µm thick (LUMIRROR made by Toray Industries, Inc.) by using a doctor blade (made by Gardner, Inc.), and after it was dried, a blue display layer about 15 µm thick was formed.

To stack display layers of three colors on top of each other, green and red display layers were successively formed on the blue display layer by the same method, and a PET film 125 µm thick (LUMIRROR made by Toray Industries, Inc.) was tightly bonded onto the red display layer, using a laminator.

A light absorption layer of black resin was formed on the back of the PET film of a non-display side, and a display element in which three-color display layers of micro capsule structure were stacked was obtained.

EXPERIMENT EXAMPLE 5

In an experiment example 5, a display element having a photoconductive layer on the substrate of the non-display side of the experiment example 2 was fabricated.

On a glass substrate 1.1 mm thick (7059 made by Corning) provided with an ITO transparent electrode, as a charge generating layer, a solution of 2.1 wt % chlorogallium phthalocyanine, 1.8 wt % vinyl chloride/vinyl acetate copolymer resin, 31.7 wt % n-butyl acetate, 64.4 wt % xylene was applied to produce a coating 0.25 µm thick by the dip coating method.

Moreover, on top of the charge generation layer, as a charge transport layer, a solution of a 7.2 wt % 3,3'-dimethyl-N,N,N',N'-tetrakis (4-methylphenyl)-1,1'-biphenyl-4,4'-diamine, 10.8 wt % poly (4,4'-cyclohexylden diphenylene carbonate, and 82 wt % monochlorobenzene was applied to produce a coating 3 µm thick by the dip coating method.

Moreover, a light absorption layer of black resin was formed on the photoconductive layer having the charge generation layer and the charge transport layer.

With the obtained substrate as the non-display side, a display element in which display layers of three colors are stacked on the light absorption layer was obtained by the same method as in the experiment example 2.

EXPERIMENT EXAMPLE 6

In the experiment example 6, a display element in which dichroic dyes are added to the display layers of the experiment example 2 was fabricated.

As a material to constitute a cyan display layer, a 0.5 wt % dichroic dye (SI497 made by Mitsui Toatsu Chemicals, Inc.) to absorb green light was added to the blue cholesteric liquid crystal used in the experiment example 2.

As a material to constitute a magenta display layer, a 0.5 wt % dichroic dye (S618 made by Mitsui Toatsu Chemicals, Inc.) to absorb red light was added to the red cholesteric liquid crystal used in the experiment example 2.

As a material to constitute a yellow display layer, a 0.5 wt % dichroic dye (SI486 made by Mitsui Toatsu Chemicals, Inc.) to absorb blue light was added to the green cholesteric liquid crystal used in the experiment example 2.

A display element in which display layers of three colors made of cholesteric liquid crystals with dichroic dyes were stacked was obtained with the construction that the display layers of three colors are stacked using the obtained mixed materials of cyan, magenta, and yellow by the same method as in the experiment example 2, and a light scattering layer of white resin is formed on the back of the substrate of the non-display side.

As described above, according to the present invention, in a display element in which plural display layers of three or more layers to display mutually different color lights are stacked within one pixel and which controls display states of the plural display layers by applying a voltage from the outside of the plural display layers, eight colors—white, black, blue, green, red, cyan, magenta, and yellow—can be displayed within one pixel, and a color reproduction area can be enlarged.

The entire disclosure of Japanese Patent Application No. 2000-010148 filed on Jan. 14, 2000 including specification, claims, drawings and abstract is incorporated herein by reference in its entirety.

What is claimed is:

1. A display element comprising:
   three or more display layers each including cholesteric liquid crystal, the display layers selectively reflecting lights of different peak wavelengths, respectively, being stacked within one pixel, and having a threshold voltage of orientation change of the cholesteric liquid crystals differing from each other for voltage applied from the outside of the display layers, each display layer having a threshold voltage Vpf of change from a planar state to a focal conic state and a threshold voltage Vfh of change from a focal conic state to a homeotropic state,
   wherein, between a display layer having a greatest threshold voltage Vpf and a display layer having a smallest threshold voltage Vfh, the greatest threshold voltage Vpf crosses over the smallest threshold voltage Vfh such that the threshold voltage Vpf is greater than the threshold voltage Vfh.

2. A method of writing an image to the display element of claim 1, comprising the steps of:
   causing a writing signal to include at least a refresh period, a select period, and a following non-voltage display period; and
   applying the writing signal to the display element,
   wherein a voltage Vr in the refresh period is greater than a voltage Vs in the select period.

3. An apparatus that writes an image to the display element of claim 1, comprising:
   a signal applying unit applying a writing signal which includes at least a refresh period, a select period, and a following non-voltage display period,
   wherein a voltage Vr in the refresh period is greater than a voltage Vs in the select period.

4. A display apparatus comprising:
   the display element of claim 1; and
   a writing apparatus that writes an image thereto,
   wherein the writing apparatus applies a writing signal which includes at least a refresh period, a select period, and a following non-voltage display period, and a voltage Vr in the refresh period is greater than a voltage Vs in the select period.

5. A display element comprising:
   three or more display layers including cholesteric liquid crystals selectively absorbing lights of different peak wavelengths, respectively, by adding dichroic dyes to the cholesteric liquid crystals or by the dichroism of the cholesteric liquid crystals themselves, the display layers being stacked within one pixel, and having threshold voltages of orientation change of the cholesteric liquid crystals differing from each other for a voltage applied from the outside of the display layers, each display layer having a threshold voltage Vpf of change from a planar state to a focal conic state and a threshold voltage Vfh of change from a focal conic state to a homeotropic state,
   wherein, between a display layer having a greatest threshold voltage Vpf and a display layer having a smallest threshold voltage Vfh, the greatest threshold voltage Vpf crosses over the smallest threshold voltage Vfh such that the threshold voltage Vpf is greater than the threshold voltage Vfh.

6. A method of writing an image to the display element of claim 5, comprising the steps of:

causing a writing signal to include at least a refresh period, a select period, and a following non-voltage display period; and applying the writing signal to the display element, wherein a voltage Vr in the refresh period is greater than a voltage Vs in the select period.

7. An apparatus that writes an image to the display element of claim 5, comprising:

a signal applying unit applying a writing signal which includes at least a refresh period, a select period, and a following non-voltage display period, wherein a voltage Vr in the refresh period is greater than a voltage Vs in the select period.

8. A display apparatus comprising:

the display element of claim 1; and a writing apparatus that writes an image thereto, wherein the writing apparatus applies a writing signal which includes at least a refresh period, a select period, and a following non-voltage display period, and a voltage Vr in the refresh period is greater than a voltage Vs in the select period.

* * * * *

UNITED STATES PATENT AND TRADEMARK OFFICE
CERTIFICATE OF CORRECTION

PATENT NO.   : 6,618,102 B2
DATED        : September 9, 2003
INVENTOR(S)  : Harada et al.

It is certified that error appears in the above-identified patent and that said Letters Patent is hereby corrected as shown below:

<u>Title page,</u>
Item [*] Notice, delete the phrase "by 0 days" and insert -- by 228 days --

Signed and Sealed this

Twelfth Day of October, 2004

JON W. DUDAS
*Director of the United States Patent and Trademark Office*